(12) United States Patent
Jennings

(10) Patent No.: US 8,566,309 B2
(45) Date of Patent: Oct. 22, 2013

(54) MONITORING HASHTAGS IN MICRO-BLOG POSTS TO PROVIDE ONE OR MORE CROWD-BASED FEATURES

(75) Inventor: Kenneth Jennings, Raleigh, NC (US)

(73) Assignee: Waldeck Technology, LLC, Portsmouth, NH (US)

( * ) Notice: Subject to any disclaimer, the term of this patent is extended or adjusted under 35 U.S.C. 154(b) by 146 days.

(21) Appl. No.: 13/039,356

(22) Filed: Mar. 3, 2011

(65) Prior Publication Data

US 2012/0066212 A1    Mar. 15, 2012

Related U.S. Application Data

(60) Provisional application No. 61/309,903, filed on Mar. 3, 2010.

(51) Int. Cl.
G06F 17/30 (2006.01)

(52) U.S. Cl.
CPC .................. *G06F 17/30017* (2013.01)
USPC ....................................................... 707/723

(58) Field of Classification Search
USPC .................. 707/723, 738, 748; 709/204, 229; 715/745
See application file for complete search history.

(56) References Cited

U.S. PATENT DOCUMENTS

| | | | |
|---|---|---|---|
| 6,820,081 B1 | 11/2004 | Kawai et al. | |
| 6,999,783 B2 | 2/2006 | Toyryla et al. | |
| 7,423,580 B2 | 9/2008 | Markhovsky et al. | |
| 7,787,886 B2 | 8/2010 | Markhovsky et al. | |
| 8,208,943 B2 * | 6/2012 | Petersen et al. | 455/456.1 |
| 2007/0075898 A1 | 4/2007 | Markhovsky et al. | |
| 2007/0281716 A1 | 12/2007 | Altman et al. | |
| 2009/0164459 A1 * | 6/2009 | Jennings et al. | 707/5 |
| 2010/0153213 A1 | 6/2010 | Pomplun et al. | |
| 2010/0197318 A1 | 8/2010 | Petersen et al. | |
| 2010/0197319 A1 | 8/2010 | Petersen et al. | |
| 2010/0198826 A1 | 8/2010 | Petersen et al. | |
| 2010/0198828 A1 | 8/2010 | Petersen et al. | |
| 2010/0198862 A1 | 8/2010 | Jennings et al. | |
| 2010/0198870 A1 | 8/2010 | Petersen et al. | |
| 2010/0198917 A1 | 8/2010 | Petersen et al. | |
| 2011/0043475 A1 * | 2/2011 | Rigazio et al. | 345/173 |
| 2011/0055723 A1 * | 3/2011 | Lightstone et al. | 715/752 |
| 2012/0064919 A1 | 3/2012 | Purdy | |

OTHER PUBLICATIONS

Kai Zhang et al., The Study and Implementation of Micro-blog Search Engine Based on Nutch, 2010, IEEE, V1-850-V1-854.*
Farhi, Paul, "The Twitter Explosion," American Journalism Review, Apr./May 2009 Issue, at <http://ajr.org/article_printable.asp?id=4756>, printed Jun. 25, 2009, 6 pages.
Joly, A. et al., "Contextual Recommendation of Social Updates, a Tag-based Framework," International Conference on Active Media Technology (AMT'10), Toronto, Canada, Aug. 28-30, 2010, found at <http://liris.cnrs.fr/Documents/Liris-4747.pdf>, 12 pages.

* cited by examiner

*Primary Examiner* — Jean B Fleurantin

(57) ABSTRACT

Systems and methods are disclosed for monitoring hashtags in micro-blog posts, or status updates, from users to provide one or more crowd-based features. In one embodiment, a micro-blog post of a user in a crowd of users is obtained. The crowd of users is a group of users within a predefined spatial proximity to one another. A hashtag in the micro-blog post is then obtained, and a crowd-based feature is provided based on the hashtag.

27 Claims, 21 Drawing Sheets

NEW BOUNDING BOX

NEW BOUNDING BOX

MONITORING HASHTAGS IN MICRO-BLOG POSTS TO PROVIDE ONE OR MORE CROWD-BASED FEATURES

RELATED APPLICATIONS

This application claims the benefit of provisional patent application Ser. No. 61/309,903, filed Mar. 3, 2010, the disclosure of which is hereby incorporated herein by reference in its entirety.

FIELD OF THE DISCLOSURE

The present disclosure relates to utilizing micro-blog posts to provide crowd-based features.

BACKGROUND

Micro-blogging services, such as the Twitter® micro-blogging and social networking service, have become increasingly popular. The Twitter® micro-blogging and social networking service allows a user to post messages (i.e., tweets) that are then viewable by other users that subscribe to messages from the user (i.e., are "followers" of the user). The Twitter® micro-blogging and social networking service also allows users to insert hashtags in the form of #{keyword} (e.g., #musicmonday) into their tweets to identify relevant keywords or topics. The hashtags may then be used to search for tweets of interest. For example, a user may search for the hashtag #musicmonday in order to view all tweets including the hashtag #musicmonday. While, at this point, only the Twitter® micro-blogging and social networking service utilizes hashtags, hashtags could and are expected to be used in other existing or future micro-blogging services.

In addition, crowd-based services are also emerging. One exemplary crowd-based service is described in commonly owned and assigned U.S. Patent Application Publication No. 2010/0198828, entitled FORMING CROWDS AND PROVIDING ACCESS TO CROWD DATA IN A MOBILE ENVIRONMENT, which published on Aug. 5, 2010; U.S. Patent Application Publication No. 2010/0197318, entitled ANONYMOUS CROWD TRACKING, which published on Aug. 5, 2010; U.S. Patent Application Publication No. 2010/0198826, entitled MAINTAINING A HISTORICAL RECORD OF ANONYMIZED USER PROFILE DATA BY LOCATION FOR USERS IN A MOBILE ENVIRONMENT, which published on Aug. 5, 2010; U.S. Patent Application Publication No. 2010/0198917, entitled CROWD FORMATION FOR MOBILE DEVICE USERS, which published on Aug. 5, 2010; U.S. Patent Application Publication No. 2010/0198870, entitled SERVING A REQUEST FOR DATA FROM A HISTORICAL RECORD OF ANONYMIZED USER PROFILE DATA IN A MOBILE ENVIRONMENT, which published on Aug. 5, 2010; U.S. Patent Application Publication No. 2010/0198862, entitled HANDLING CROWD REQUESTS FOR LARGE GEOGRAPHIC AREAS, which published on Aug. 5, 2010; and U.S. Patent Application Publication No. 2010/0197319, entitled MODIFYING A USER'S CONTRIBUTION TO AN AGGREGATE PROFILE BASED ON TIME BETWEEN LOCATION UPDATES AND EXTERNAL EVENTS, which published on Aug. 5, 2010; all of which are hereby incorporated herein by reference in their entireties.

What is needed is a system and method that leverages hashtags to provide crowd-based features.

SUMMARY

Systems and methods are disclosed for monitoring hashtags in micro-blog posts, or status updates, from users to provide one or more crowd-based features. In one embodiment, a micro-blog post of a user in a crowd of users is obtained. The crowd of users is a group of users within a predefined spatial proximity to one another. A hashtag in the micro-blog post is then obtained, and a crowd-based feature is provided based on the hashtag. More specifically, in one embodiment, the hashtag is determined to be representative of an interest of the users in the crowd and, as such, the hashtag is recorded and utilized as an interest of the crowd. For instance, the hashtag may be added to a profile of the crowd. In another embodiment, the hashtag is determined to be indicative of a rating of the crowd and, as such, a rating of the crowd is updated based on the hashtag.

In yet another embodiment, a micro-blog post of a user is obtained. In this embodiment, the user may or may not be in a crowd of users. A hashtag in the micro-blog post is then obtained. If the hashtag is determined to be one of a number of predefined action words, a corresponding crowd-based action is performed. The predefined action word may enable the user to, for example, explicitly tag the crowd with one or more keywords, explicitly remove one or more tags previously assigned to the crowd, explicitly rate the crowd, or initiate creation of a desired crowd.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
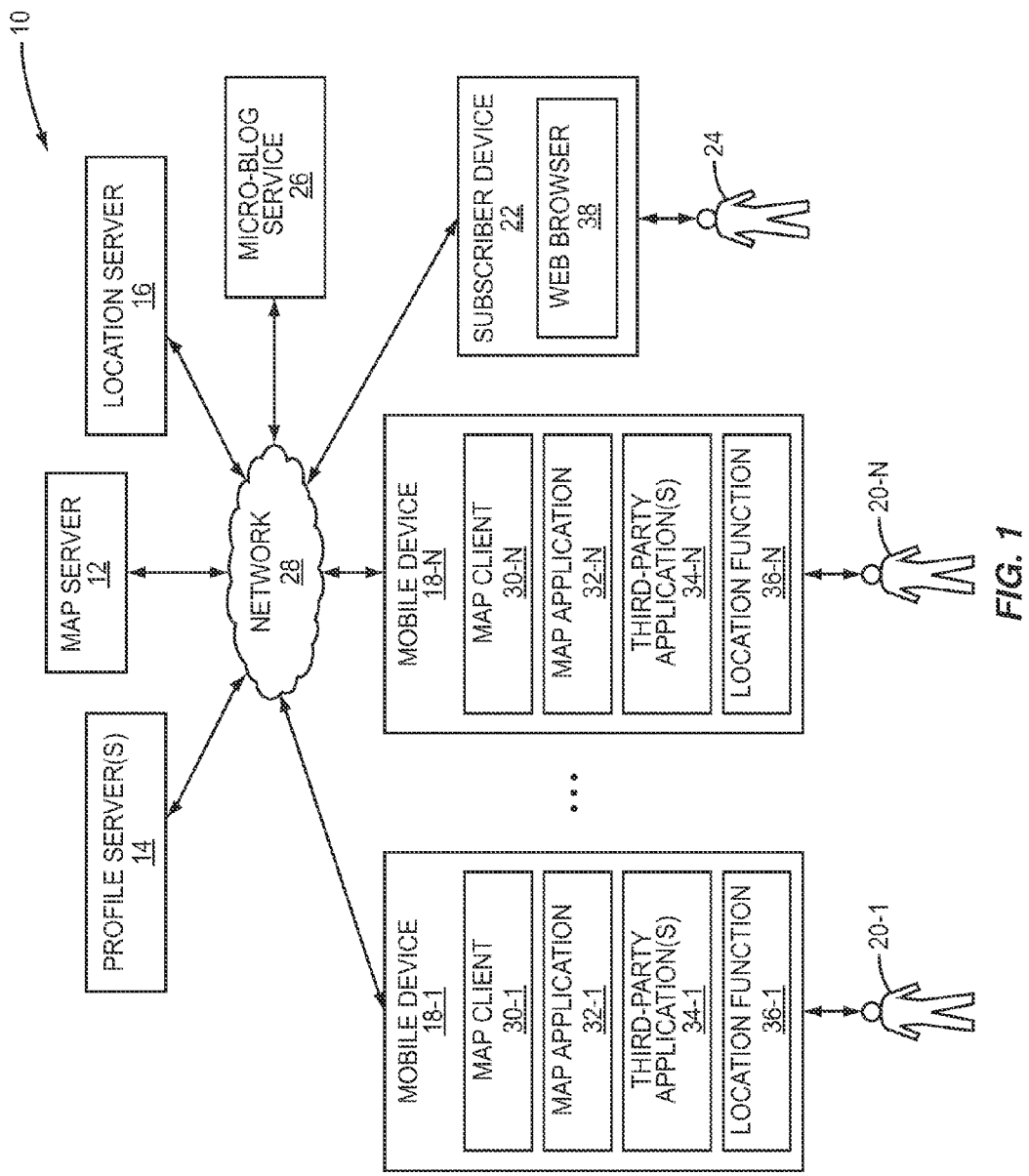
FIG. 1 illustrates a Mobile Aggregate Profile (MAP) system according to one embodiment of the present disclosure.
Figure 10:
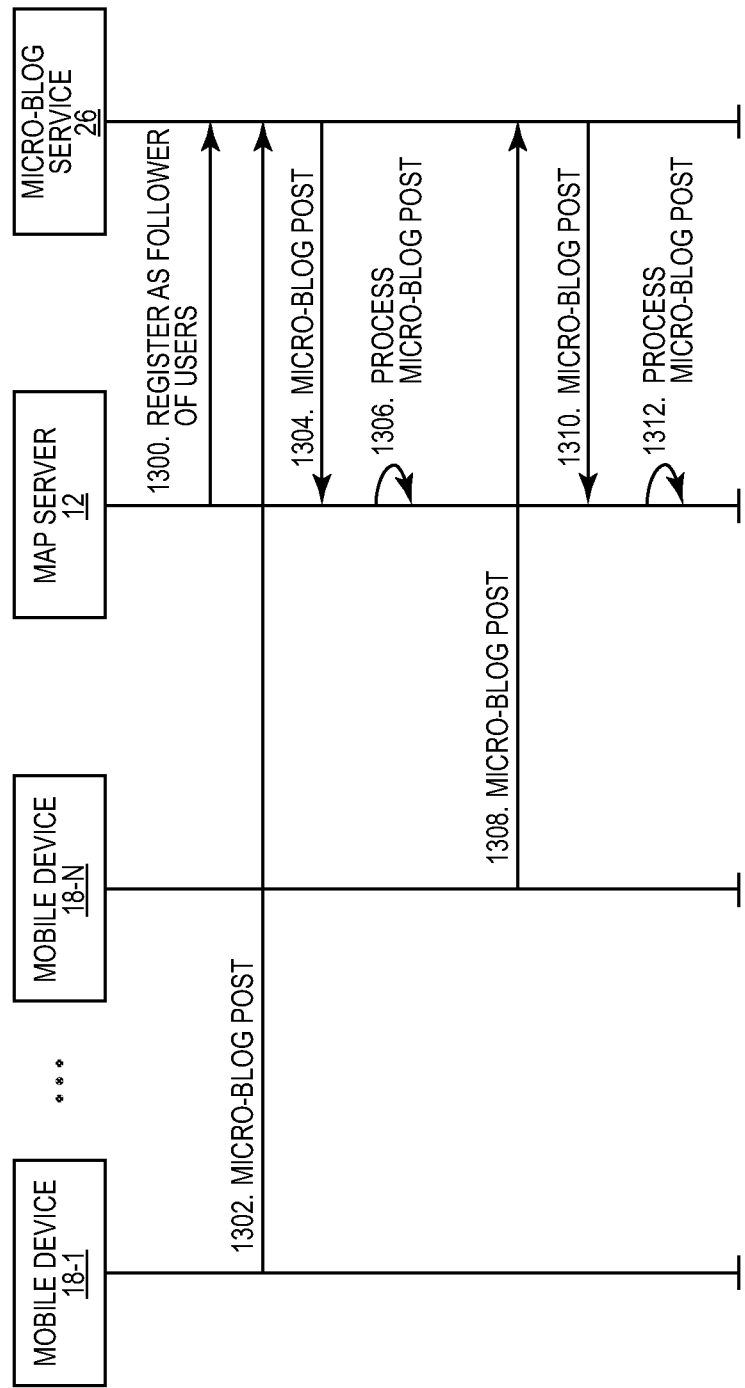
Figure 11:
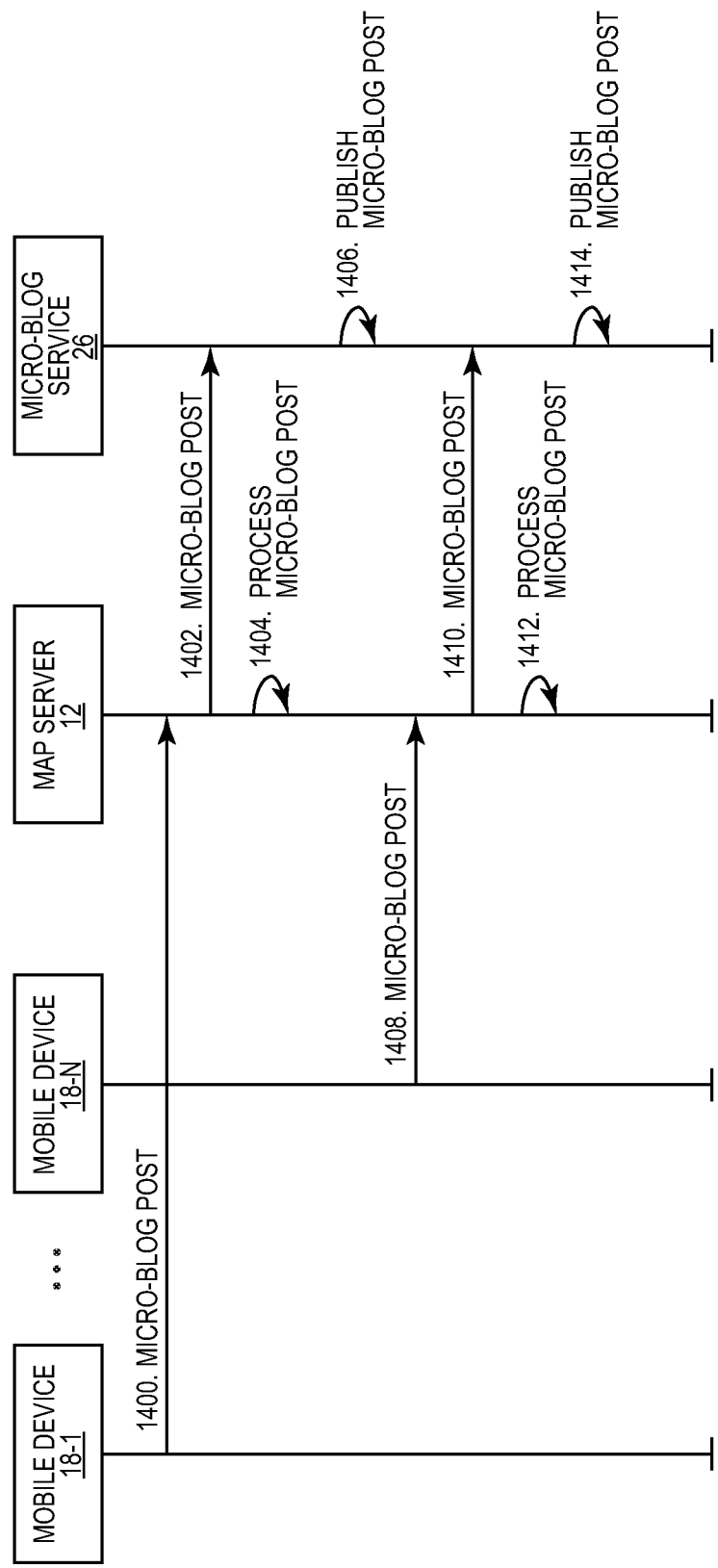
Figure 12:
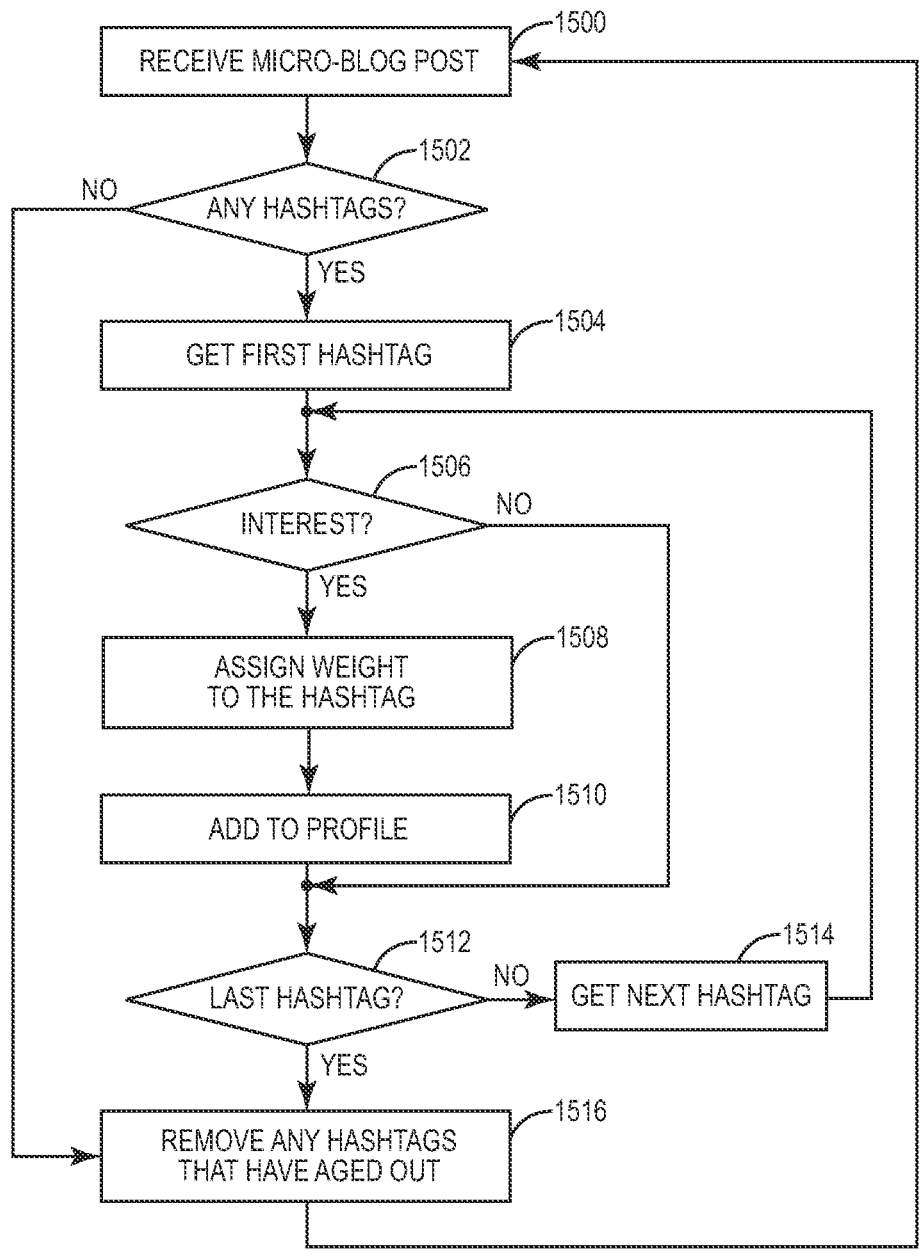
Figure 13:
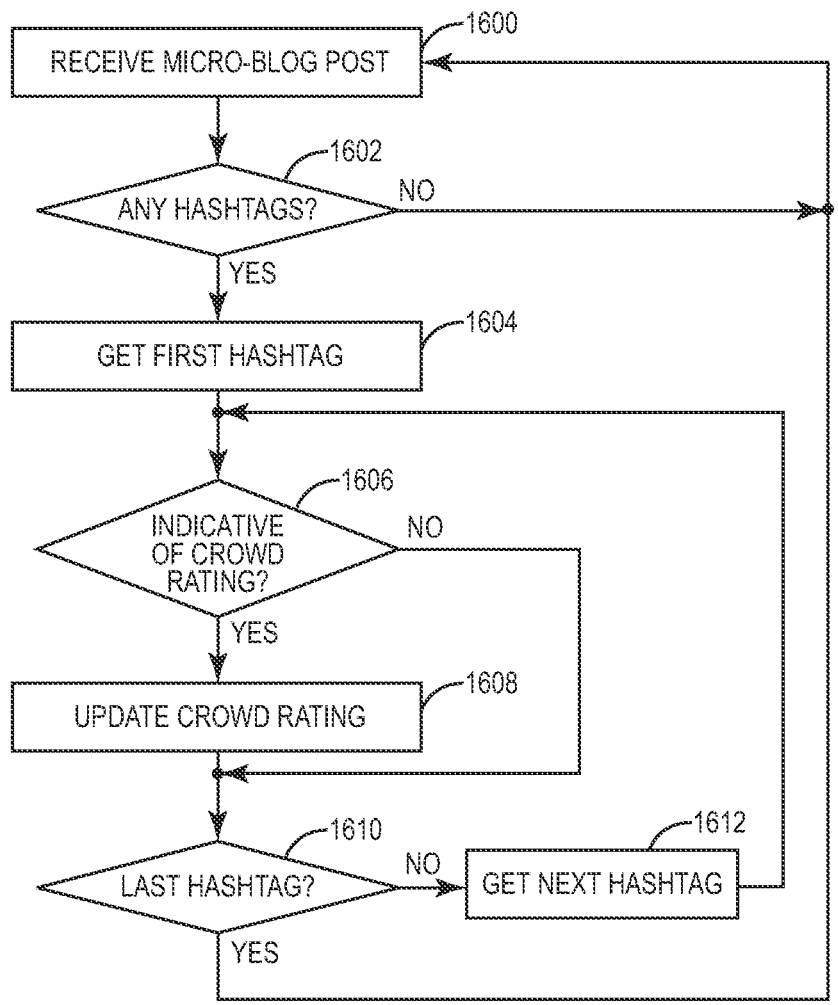
Figure 14:
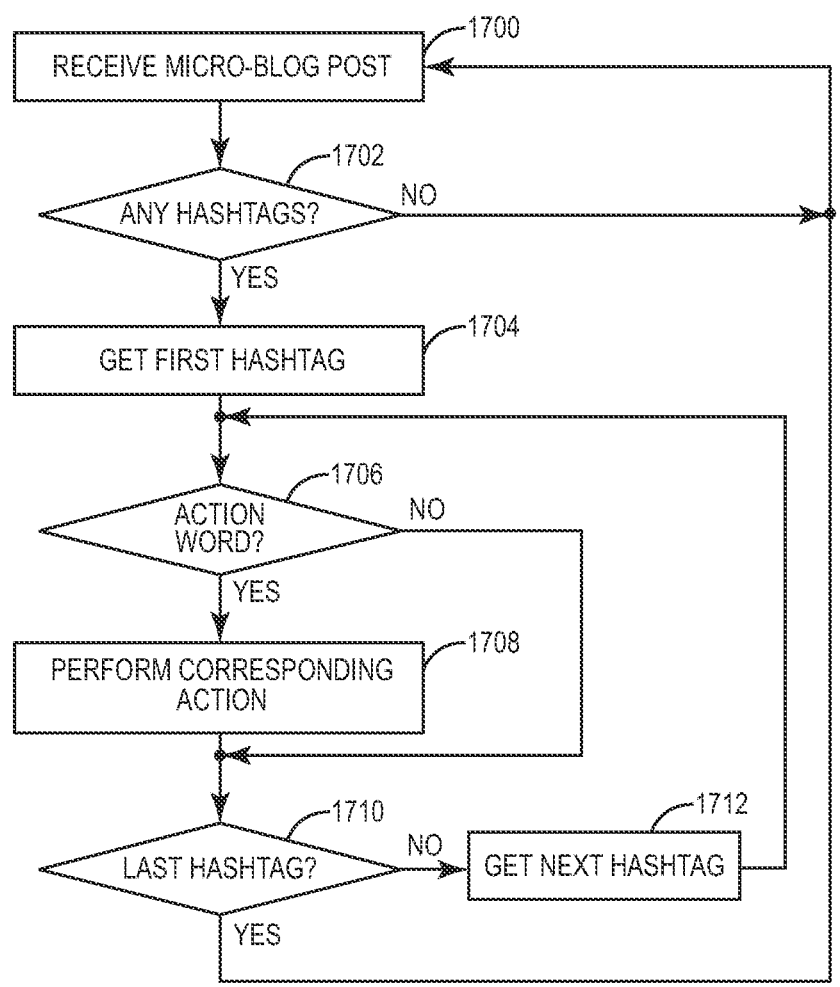
Figure 15:
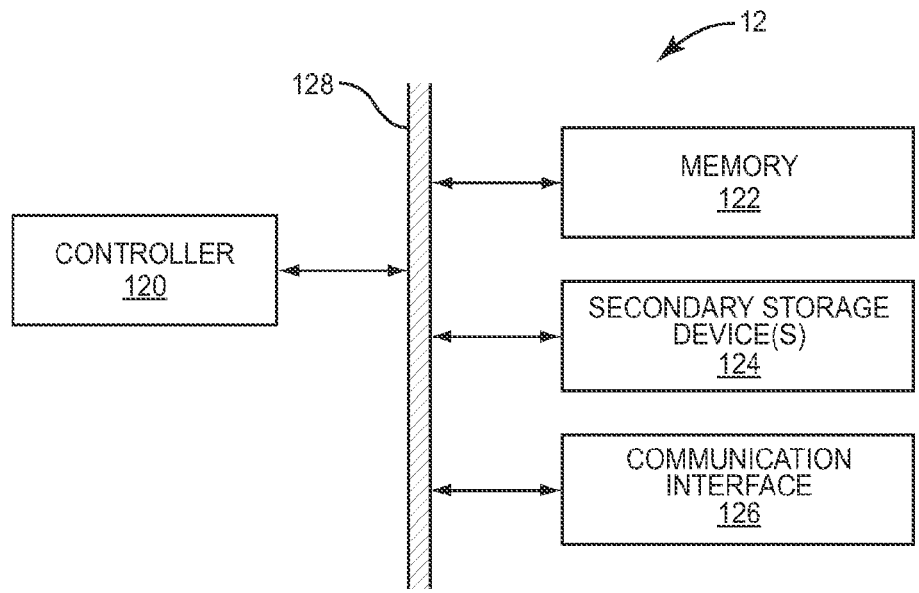
Figure 16:
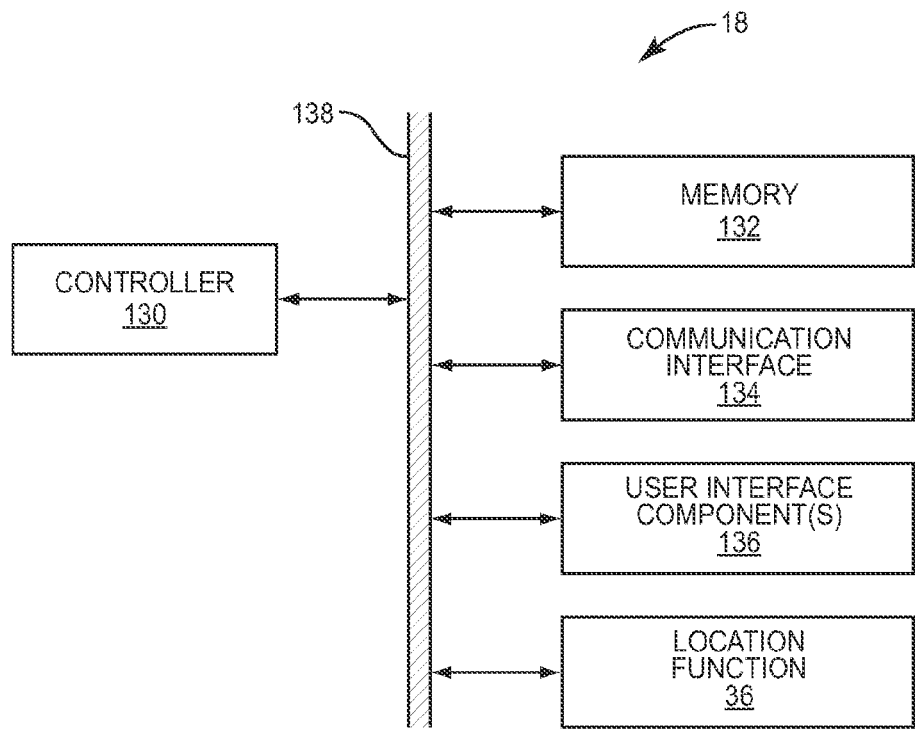

FIGS. 7A through 7D graphically illustrate the crowd formation process of FIGS. 6A through 6D for a scenario where the crowd formation process is triggered by a location update for a user having no old location;

FIGS. 8A through 8F graphically illustrate the crowd formation process of FIGS. 6A through 6D for a scenario where the new and old bounding boxes overlap;

FIGS. 9A through 9E graphically illustrate the crowd formation process of FIGS. 6A through 6D in a scenario where the new and old bounding boxes do not overlap;

FIG. 10 illustrates the operation of the system of FIG. 1 wherein the MAP server monitors micro-blog posts according to one embodiment of the present disclosure;

FIG. 11 illustrates the operation of the system of FIG. 1 wherein the MAP server monitors micro-blog posts according to another embodiment of the present disclosure;

FIG. 12 illustrates the operation of the MAP server to process micro-blog posts to determine interests of crowds of users according to one embodiment of the present disclosure;

FIG. 13 illustrates the operation of the MAP server to process micro-blog posts to update crowd ratings of crowds of users according to one embodiment of the present disclosure;

FIG. 14 illustrates the operation of the MAP server to process micro-blog posts to process predefined action words including the micro-blog posts in order to perform corresponding crowd-based actions according to one embodiment of the present disclosure;

FIG. 15 is a block diagram of the MAP server according to one embodiment of the present disclosure; and FIG. 16 is a block diagram of one of the mobile devices according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

FIG. 1 illustrates a Mobile Aggregate Profile (MAP) system 10 (hereinafter "system 10") that enables monitoring of micro-blog posts in order to provide one or more crowd-based features according to one embodiment of the present disclosure. Note that the system 10 is exemplary and is not intended to limit the scope of the present disclosure. In this embodiment, the system 10 includes a MAP server 12, one or more profile servers 14, a location server 16, a number of mobile devices 18-1 through 18-N (generally referred to herein collectively as mobile devices 18 and individually as mobile device 18) having associated users 20-1 through 20-N (generally referred to herein collectively as users 20 and individually as user 20), a subscriber device 22 having an associated subscriber 24, and a micro-blogging service 26 communicatively coupled via a network 28. The network 28 may be any type of network or any combination of networks. Specifically, the network 28 may include wired components, wireless components, or both wired and wireless components. In one exemplary embodiment, the network 28 is a distributed public network such as the Internet, where the mobile devices 18 are enabled to connect to the network 28 via local wireless connections (e.g., WiFi® or IEEE 802.11 connections) or wireless telecommunications connections (e.g., 3G or 4G telecommunications connections such as GSM, LTE, W-CDMA, or WiMAX® connections).

As discussed below in detail, the MAP server 12 operates to obtain current locations, including location updates, and user profiles of the users 20 of the mobile devices 18. The current locations of the users 20 can be expressed as positional geographic coordinates such as latitude-longitude pairs, and a height vector (if applicable), or any other similar information capable of identifying a given physical point in space in a two-dimensional or three-dimensional coordinate system. Using the current locations and user profiles of the users 20, the MAP server 12 is enabled to provide a number of features such as, but not limited to, forming crowds of users using current locations and/or user profiles of the users 20, generating aggregate profiles for crowds of users, and tracking crowds. Note that while the MAP server 12 is illustrated as a single server for simplicity and ease of discussion, it should be appreciated that the MAP server 12 may be implemented as a single physical server or multiple physical servers operating in a collaborative manner for purposes of redundancy and/or load sharing.

In general, the one or more profile servers 14 operate to store user profiles for a number of persons including the users 20 of the mobile devices 18. For example, the one or more profile servers 14 may be servers providing social network services such as the Facebook® social networking service, the MySpace® social networking service, the LinkedIN® social networking service, or the like. As discussed below, using the one or more profile servers 14, the MAP server 12 is enabled to directly or indirectly obtain the user profiles of the users 20 of the mobile devices 18. The location server 16 generally operates to receive location updates from the mobile devices 18 and make the location updates available to entities such as, for instance, the MAP server 12. In one exemplary embodiment, the location server 16 is a server operating to provide Yahoo!'s Fire Eagle® service.

The mobile devices 18 may be mobile smart phones, portable media player devices, mobile gaming devices, or the like. Some exemplary mobile devices that may be programmed or otherwise configured to operate as the mobile devices 18 are the Apple® iPhone®, the Palm Pre®, the Samsung Rogue™, the Blackberry Storm™, the Motorola Droid or similar phone running Google's Android™ Operating System, an Apple® iPad®, and the Apple® iPod Touch® device. However, this list of exemplary mobile devices is not exhaustive and is not intended to limit the scope of the present disclosure.

The mobile devices 18-1 through 18-N include MAP clients 30-1 through 30-N (generally referred to herein collectively as MAP clients 30 or individually as MAP client 30), MAP applications 32-1 through 32-N (generally referred to herein collectively as MAP applications 32 or individually as MAP application 32), third-party applications 34-1 through 34-N (generally referred to herein collectively as third-party applications 34 or individually as third-party application 34), and location functions 36-1 through 36-N (generally referred to herein collectively as location functions 36 or individually as location function 36), respectively. The MAP client 30 is preferably implemented in software. In general, in the preferred embodiment, the MAP client 30 is a middleware layer operating to interface an application layer (i.e., the MAP application 32 and the third-party applications 34) to the MAP server 12. More specifically, the MAP client 30 enables the MAP application 32 and the third-party applications 34 to request and receive data from the MAP server 12. In addition, the MAP client 30 enables applications, such as the MAP application 32 and the third-party applications 34, to access data from the MAP server 12.

The MAP application 32 is also preferably implemented in software. The MAP application 32 generally provides a user interface component between the user 20 and the MAP server 12. More specifically, among other things, the MAP application 32 enables the user 20 to initiate requests for crowd data from the MAP server 12 and present corresponding crowd data returned by the MAP server 12 to the user 20. The MAP application 32 also enables the user 20 to configure various settings. For example, the MAP application 32 may enable the user 20 to select a desired social networking service (e.g., Facebook®, MySpace®, LinkedIN®, etc.) from which to obtain the user profile of the user 20 and provide any necessary credentials (e.g., username and password) needed to access the user profile from the social networking service.

The third-party applications 34 are preferably implemented in software. The third-party applications 34 operate to access the MAP server 12 via the MAP client 30. The third-party applications 34 may utilize data obtained from the MAP server 12 in any desired manner. As an example, one of the third-party applications 34 may be a gaming application that utilizes crowd data to notify the user 20 of Points of Interest (POIs) or Areas of Interest (AOIs) where crowds of interest are currently located. It should be noted that while the MAP client 30 is illustrated as being separate from the MAP application 32 and the third-party applications 34, the present disclosure is not limited thereto. The functionality of the MAP client 30 may alternatively be incorporated into the MAP application 32 and the third-party applications 34.

The location function 36 may be implemented in hardware, software, or a combination thereof. In general, the location function 36 operates to determine or otherwise obtain the location of the mobile device 18. For example, the location function 36 may be or include a Global Positioning System (GPS) receiver. In addition or alternatively, the location function 36 may include hardware and/or software that enables improved location tracking in indoor environments such as, for example, shopping malls. For example, the location function 36 may be part of or compatible with the InvisiTrack Location System provided by InvisiTrack and described in U.S. Pat. No. 7,423,580 entitled "Method and System of Three-Dimensional Positional Finding" which issued on Sep. 9, 2008, U.S. Pat. No. 7,787,886 entitled "System and Method for Locating a Target using RFID" which issued on Aug. 31, 2010, and U.S. Patent Application Publication No. 2007/0075898 entitled "Method and System for Positional Finding Using RF, Continuous and/or Combined Movement" which published on Apr. 5, 2007, all of which are hereby incorporated herein by reference for their teachings regarding location tracking.

The subscriber device 22 is a physical device such as a personal computer, a mobile computer (e.g., a notebook computer, a netbook computer, a tablet computer, etc.), a mobile smart phone, or the like. The subscriber 24 associated with the subscriber device 22 is a person or entity. In general, the subscriber device 22 enables the subscriber 24 to access the MAP server 12 via a web browser 38 to obtain various types of data, preferably for a fee. For example, the subscriber 24 may pay a fee to have access to crowd data such as aggregate profiles for crowds located at one or more POIs and/or located in one or more AOIs, pay a fee to track crowds, or the like. Note that the web browser 38 is exemplary. In another embodiment, the subscriber device 22 is enabled to access the MAP server 12 via a custom application.

Lastly, the micro-blogging service 26 is a service that enables the users 20 to send and receive micro-blog posts. As used herein, a micro-blog post is a message posted by a user for publication via the micro-blogging service 26. As used herein, a micro-blog post includes text. In addition, the micro-blog post may optionally include audio, video, an image, or any combination thereof. As an example, a micro-blog post may be a tweet posted by a user of the Twitter® micro-blogging and social networking service. Lastly, as used herein, the micro-blogging service 26 is a micro-blogging service such as, but not limited to, the Twitter® micro-blogging and social networking service that enables the use of hashtags. Preferably, the hashtags are included in the text of the micro-blog post and take the form of #{keyword}. However, other formats may be used (e.g., %{keyword}).

Before proceeding, it should be noted that while the system 10 of FIG. 1 illustrates an embodiment where the one or more profile servers 14, the location server 16, and the micro-blogging service 26 are separate from the MAP server 12, the present disclosure is not limited thereto. In an alternative embodiment, the functionality of the one or more profile servers 14, the location server 16, and/or the micro-blogging service 26 may be implemented within the MAP server 12. Further, while the profile servers 14, the location server 16, and the micro-blogging service 26 are separate in the embodiment of FIG. 1, in another embodiment, the functionality of the profile servers 14, the location server 16, and/or the micro-blogging service 26 may be implemented in a single service.

Figure 2:
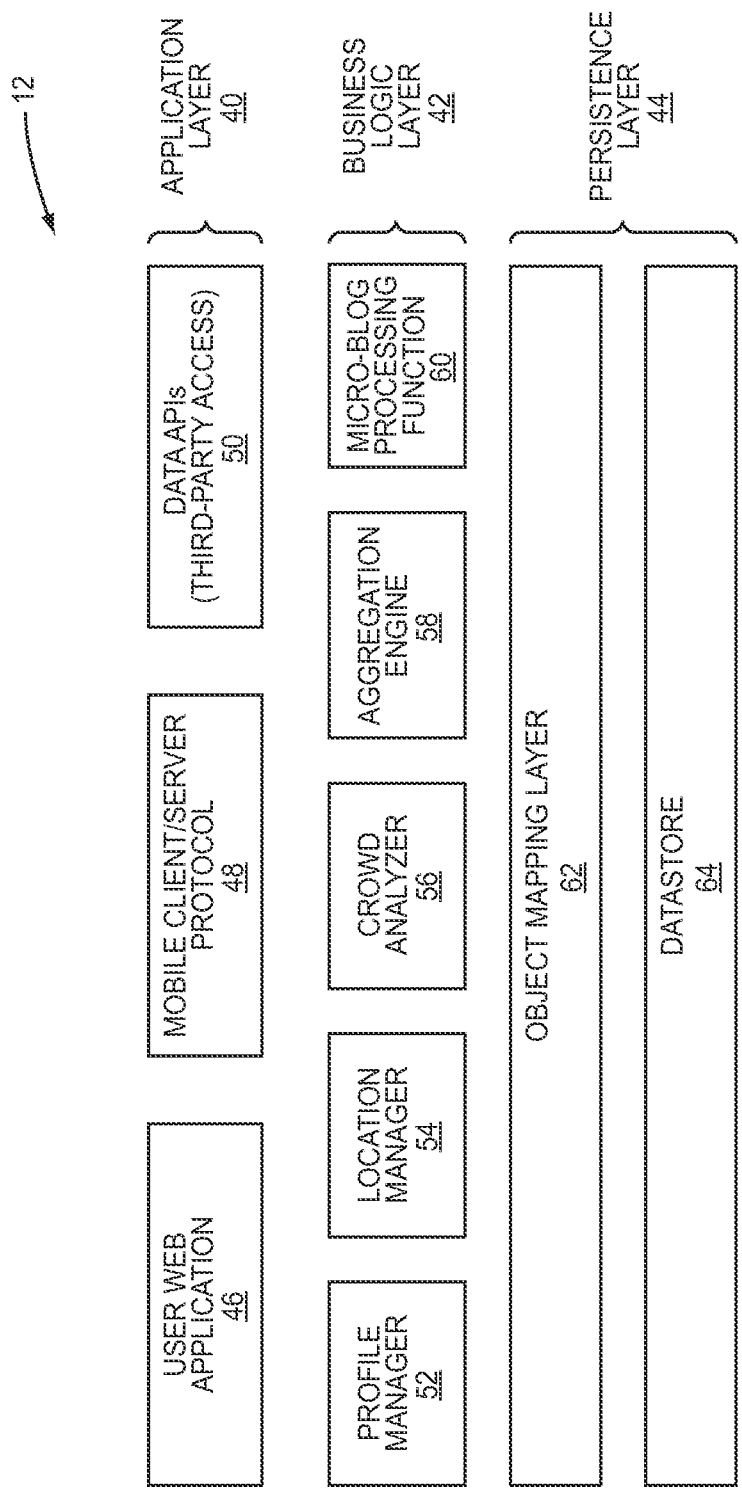
FIG. 2 is a block diagram of the MAP server of FIG. 1 according to one embodiment of the present disclosure.

FIG. 2 is a block diagram of the MAP server 12 of FIG. 1 according to one embodiment of the present disclosure. As illustrated, the MAP server 12 includes an application layer 40, a business logic layer 42, and a persistence layer 44. The application layer 40 includes a user web application 46, a mobile client/server protocol component 48, and one or more data Application Programming Interfaces (APIs) 50. The user web application 46 is preferably implemented in software and operates to provide a web interface for users, such as the subscriber 24, to access the MAP server 12 via a web browser. The mobile client/server protocol component 48 is preferably implemented in software and operates to provide an interface between the MAP server 12 and the MAP clients 30 hosted by the mobile devices 18. The data APIs 50 enable third-party services, such as the micro-blogging service 26, to access the MAP server 12.

The business logic layer 42 includes a profile manager 52, a location manager 54, a crowd analyzer 56, an aggregation engine 58, and a micro-blog processing function 60 each of which is preferably implemented in software. The profile manager 52 generally operates to obtain the user profiles of the users 20 directly or indirectly from the one or more profile servers 14 and store the user profiles in the persistence layer 44. The location manager 54 operates to obtain the current locations of the users 20 including location updates. As discussed below, the current locations of the users 20 may be obtained directly from the mobile devices 18 and/or obtained from the location server 16.

The crowd analyzer 56 operates to form crowds of users. In one embodiment, the crowd analyzer 56 utilizes a spatial crowd formation algorithm. However, the present disclosure is not limited thereto. In addition, the crowd analyzer 56 may further characterize crowds to reflect degree of fragmentation, best-case and worst-case degree of separation (DOS), and/or degree of bi-directionality. Still further, the crowd analyzer 56 may also operate to track crowds. The aggregation engine 58 generally operates to provide aggregate profile data. The aggregate profile data may be aggregate profile data for crowd(s) of users. As discussed below in detail, the micro-blog processing function 60 processes micro-blog posts made by the users 20 to provide crowd-based d features. For additional information regarding the operation of the profile manager 52, the location manager 54, the crowd analyzer 56, and the aggregation engine 58, the interested reader is directed to U.S. Patent Application Publication No. 2010/0198828, entitled FORMING CROWDS AND PROVIDING ACCESS TO CROWD DATA IN A MOBILE ENVIRONMENT, which published on Aug. 5, 2010; U.S. Patent Application Publication No. 2010/0197318, entitled ANONYMOUS CROWD TRACKING, which published on Aug. 5, 2010; U.S. Patent Application Publication No. 2010/0198826, entitled MAINTAINING A HISTORICAL RECORD OF ANONYMIZED USER PROFILE DATA BY LOCATION FOR USERS IN A MOBILE ENVIRONMENT, which published on Aug. 5, 2010; U.S. Patent Application Publication No. 2010/0198917, entitled CROWD FORMATION FOR MOBILE DEVICE USERS, which published on Aug. 5, 2010; U.S. Patent Application Publication No. 2010/0198870, entitled SERVING A REQUEST FOR DATA FROM A HISTORICAL RECORD OF ANONYMIZED USER PROFILE DATA IN A MOBILE ENVIRONMENT, which published on Aug. 5, 2010; U.S. Patent Application Publication No. 2010/0198862, entitled HANDLING CROWD REQUESTS FOR LARGE GEOGRAPHIC AREAS, which published on Aug. 5, 2010; and U.S. Patent Application Publication No. 2010/0197319, entitled MODIFYING A USER'S CONTRIBUTION TO AN AGGREGATE PROFILE BASED ON TIME BETWEEN LOCATION UPDATES AND EXTERNAL EVENTS, which published on Aug. 5, 2010; all of which have been incorporated herein by reference in their entireties.

The persistence layer 44 includes an object mapping layer 62 and a datastore 64. The object mapping layer 62 is preferably implemented in software. The datastore 64 is preferably a relational database, which is implemented in a combination of hardware (i.e., physical data storage hardware) and software (i.e., relational database software). In this embodiment, the business logic layer 42 is implemented in an object-oriented programming language such as, for example, Java. As such, the object mapping layer 62 operates to map objects used in the business logic layer 42 to relational database entities stored in the datastore 64. Note that, in one embodiment, data is stored in the datastore 64 in a Resource Description Framework (RDF) compatible format.

In an alternative embodiment, rather than being a relational database, the datastore 64 may be implemented as an RDF datastore. More specifically, the RDF datastore may be compatible with RDF technology adopted by Semantic Web activities. Namely, the RDF datastore may use the Friend-Of-A-Friend (FOAF) vocabulary for describing people, their social networks, and their interests. In this embodiment, the MAP server 12 may be designed to accept raw FOAF files describing persons, their friends, and their interests. These FOAF files are currently output by some social networking services such as LiveJournal® and Facebook®. The MAP server 12 may then persist RDF descriptions of the users 20 as a proprietary extension of the FOAF vocabulary that includes additional properties desired for the system 10.

Figure 3:
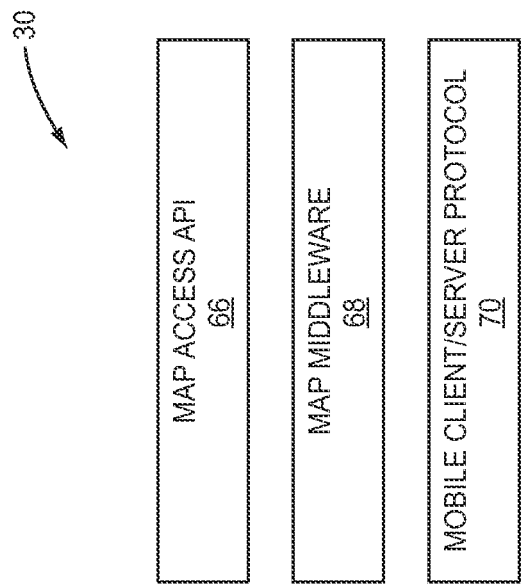
FIG. 3 is a block diagram of the MAP client of one of the mobile devices of FIG. 1 according to one embodiment of the present disclosure.

FIG. 3 illustrates the MAP client 30 of FIG. 1 in more detail according to one embodiment of the present disclosure. As illustrated, in this embodiment, the MAP client 30 includes a MAP access API 66, a MAP middleware component 68, and a mobile client/server protocol component 70. The MAP access API 66 is implemented in software and provides an interface by which the MAP application 32 and the third-party applications 34 are enabled to access the MAP client 30. The MAP middleware component 68 is implemented in software and performs the operations needed for the MAP client 30 to operate as an interface between the MAP application 32 and the third-party applications 34 at the mobile device 18 and the MAP server 12. The mobile client/server protocol component 70 enables communication between the MAP client 30 and the MAP server 12 via a defined protocol.

Figure 4:
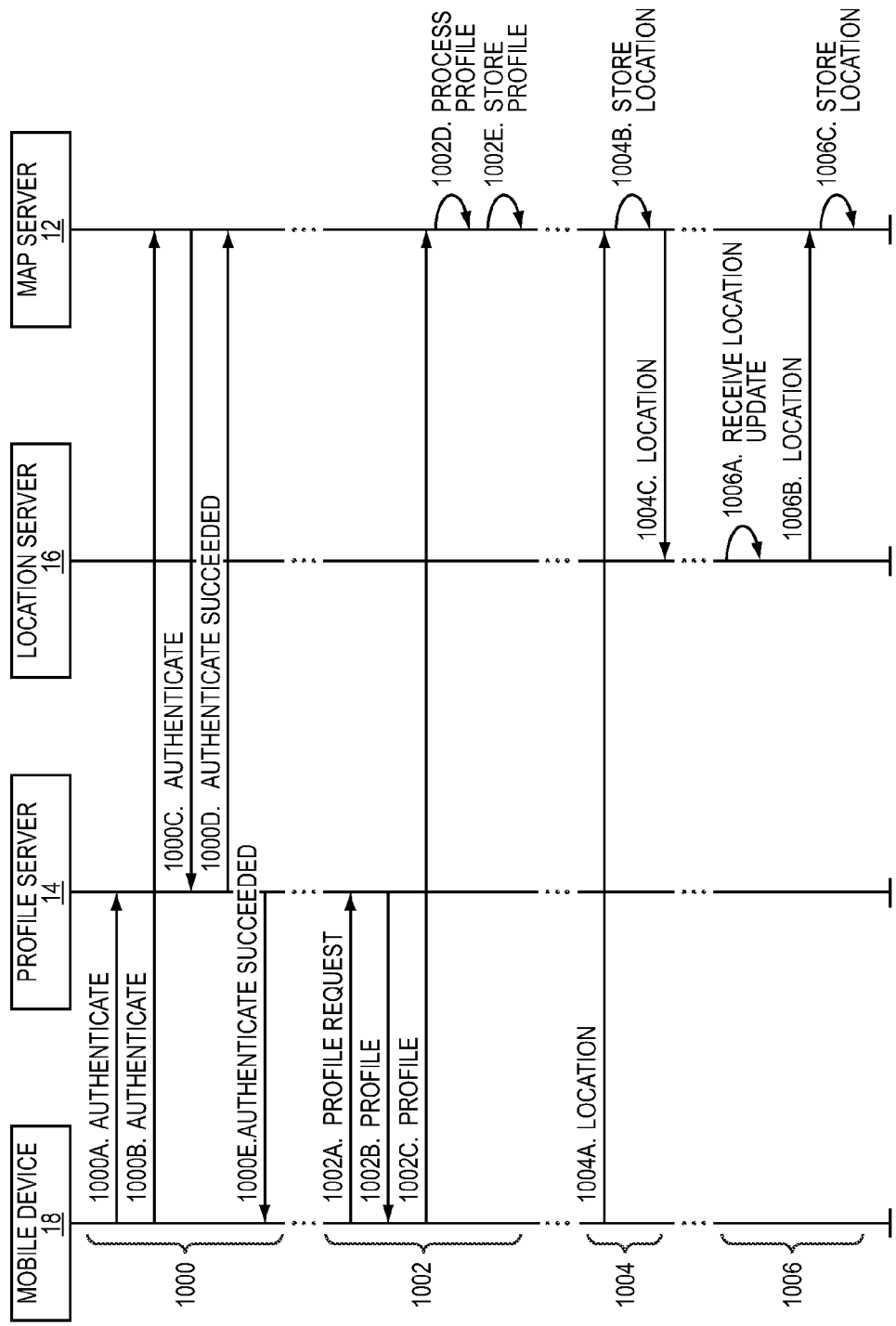
FIG. 4 illustrates the operation of the system of FIG. 1 to provide user profiles and current locations of the users of the mobile devices to the MAP server according to one embodiment of the present disclosure.

FIG. 4 illustrates the operation of the system 10 of FIG. 1 to provide the user profile of one of the users 20 of one of the mobile devices 18 to the MAP server 12 according to one embodiment of the present disclosure. This discussion is equally applicable to the other users 20 of the other mobile devices 18. First, an authentication process is performed (step 1000). For authentication, in this embodiment, the mobile device 18 authenticates with the profile server 14 (step 1000A) and the MAP server 12 (step 1000B). In addition, the MAP server 12 authenticates with the profile server 14 (step 1000C). Preferably, authentication is performed using OpenID or similar technology. However, authentication may alternatively be performed using separate credentials (e.g., username and password) of the user 20 for access to the MAP server 12 and the profile server 14. Assuming that authentication is successful, the profile server 14 returns an authentication succeeded message to the MAP server 12 (step 1000D), and the profile server 14 returns an authentication succeeded message to the MAP client 30 of the mobile device 18 (step 1000E).

At some point after authentication is complete, a user profile process is performed such that a user profile of the user 20 is obtained from the profile server 14 and delivered to the MAP server 12 (step 1002). In this embodiment, the MAP client 30 of the mobile device 18 sends a profile request to the profile server 14 (step 1002A). In response, the profile server 14 returns the user profile of the user 20 to the mobile device 18 (step 1002B). The MAP client 30 of the mobile device 18 then sends the user profile of the user 20 to the MAP server 12 (step 1002C). Note that while in this embodiment the MAP client 30 sends the complete user profile of the user 20 to the MAP server 12, in an alternative embodiment, the MAP client 30 may filter the user profile of the user 20 according to criteria specified by the user 20. For example, the user profile of the user 20 may include demographic information, general interests, music interests, and movie interests, and the user 20 may specify that the demographic information or some subset thereof is to be filtered, or removed, before sending the user profile to the MAP server 12.

Upon receiving the user profile of the user 20 from the MAP client 30 of the mobile device 18, the profile manager 52 of the MAP server 12 processes the user profile (step 1002D). More specifically, in the preferred embodiment, the profile manager 52 includes social network handlers for the social network services supported by the MAP server 12 that operate to map the user profiles of the users 20 obtained from the social network services to a common format utilized by the MAP server 12. This common format includes a number of user profile categories, or user profile slices, such as, for example, a demographic profile category, a social interaction profile category, a general interests category, a music interests profile category, and a movie interests profile category. For example, if the MAP server 12 supports user profiles from Facebook®, MySpace®, and LinkedIN®, the profile manager 52 may include a Facebook handler, a MySpace handler, and a LinkedIN handler. The social network handlers process user profiles from the corresponding social network services to generate user profiles for the users 20 in the common format used by the MAP server 12. For this example assume that the user profile of the user 20 is from Facebook®. The profile manager 52 uses a Facebook handler to process the user profile of the user 20 to map the user profile of the user 20 from Facebook® to a user profile for the user 20 for the MAP server 12 that includes lists of keywords for a number of predefined profile categories, or profile slices, such as, for example, a demographic profile category, a social interaction profile category, a general interests profile category, a music interests profile category, and a movie interests profile category. As such, the user profile of the user 20 from Facebook® may be processed by the Facebook handler of the profile manager 52 to create a list of keywords such as, for example, liberal, High School Graduate, 35-44, College Graduate, etc. for the demographic profile category; a list of keywords such as Seeking Friendship for the social interaction profile category; a list of keywords such as politics, technology, photography, books, etc. for the general interests profile category; a list of keywords including music genres, artist names, album names, or the like for the music interests profile category; and a list of keywords including movie titles, actor or actress names, director names, movie genres, or the like for the movie interests profile category. In one embodiment, the profile manager 52 may use natural language processing or semantic analysis. For example, if the Facebook® user profile of the user 20 states that the user 20 is 20 years old, semantic analysis may result in the keyword of 18-24 years old being stored in the user profile of the user 20 for the MAP server 12.

After processing the user profile of the user 20, the profile manager 52 of the MAP server 12 stores the resulting user profile for the user 20 (step 1002E). More specifically, in one embodiment, the MAP server 12 stores user records for the users 20 in the datastore 64 (FIG. 2). The user profile of the user 20 is stored in the user record of the user 20. The user record of the user 20 includes a unique identifier of the user 20, the user profile of the user 20, and, as discussed below, a current location of the user 20. Note that the user profile of the user 20 may be updated as desired. For example, in one embodiment, the user profile of the user 20 is updated by repeating step 1002 each time the user 20 activates the MAP application 32.

Note that while the discussion herein focuses on an embodiment where the user profiles of the users 20 are obtained from the one or more profile servers 14, the user profiles of the users 20 may be obtained in any desired manner. For example, in one alternative embodiment, the user 20 may identify one or more favorite websites. The profile manager 52 of the MAP server 12 may then crawl the one or more favorite websites of the user 20 to obtain keywords appearing in the one or more favorite websites of the user 20. These keywords may then be stored as the user profile of the user 20.

At some point, a process is performed such that a current location of the mobile device 18 and thus a current location of the user 20 is obtained by the MAP server 12 (step 1004). In this embodiment, the MAP application 32 of the mobile device 18 obtains the current location of the mobile device 18 from the location function 36 of the mobile device 18. The MAP application 32 then provides the current location of the mobile device 18 to the MAP client 30, and the MAP client 30 then provides the current location of the mobile device 18 to the MAP server 12 (step 1004A). Note that step 1004A may be repeated periodically or in response to a change in the current location of the mobile device 18 in order for the MAP application 32 to provide location updates for the user 20 to the MAP server 12.

In response to receiving the current location of the mobile device 18, the location manager 54 of the MAP server 12 stores the current location of the mobile device 18 as the current location of the user 20 (step 1004B). More specifically, in one embodiment, the current location of the user 20 is stored in the user record of the user 20 maintained in the datastore 64 of the MAP server 12. Note that, in the preferred embodiment, only the current location of the user 20 is stored in the user record of the user 20. In this manner, the MAP server 12 maintains privacy for the user 20 since the MAP server 12 does not maintain a historical record of the location of the user 20.

In addition to storing the current location of the user 20, the location manager 54 sends the current location of the user 20 to the location server 16 (step 1004C). In this embodiment, by providing location updates to the location server 16, the MAP server 12 in return receives location updates for the user 20 from the location server 16. This is particularly beneficial when the mobile device 18 does not permit background processes. If the mobile device 18 does not permit background processes, the MAP application 32 will not be able to provide location updates for the user 20 to the MAP server 12 unless the MAP application 32 is active. Therefore, when the MAP application 32 is not active, other applications running on the mobile device 18 (or some other device of the user 20) may directly or indirectly provide location updates to the location server 16 for the user 20. This is illustrated in step 1006 where the location server 16 receives a location update for the user 20 directly or indirectly from another application running on the mobile device 18 or an application running on another device of the user 20 (step 1006A). The location server 16 then provides the location update for the user 20 to the MAP server 12 (step 1006B). In response, the location manager 54 updates and stores the current location of the user 20 in the user record of the user 20 (step 1006C). In this manner, the MAP server 12 is enabled to obtain location updates for the user 20 even when the MAP application 32 is not active at the mobile device 18.

Figure 5:
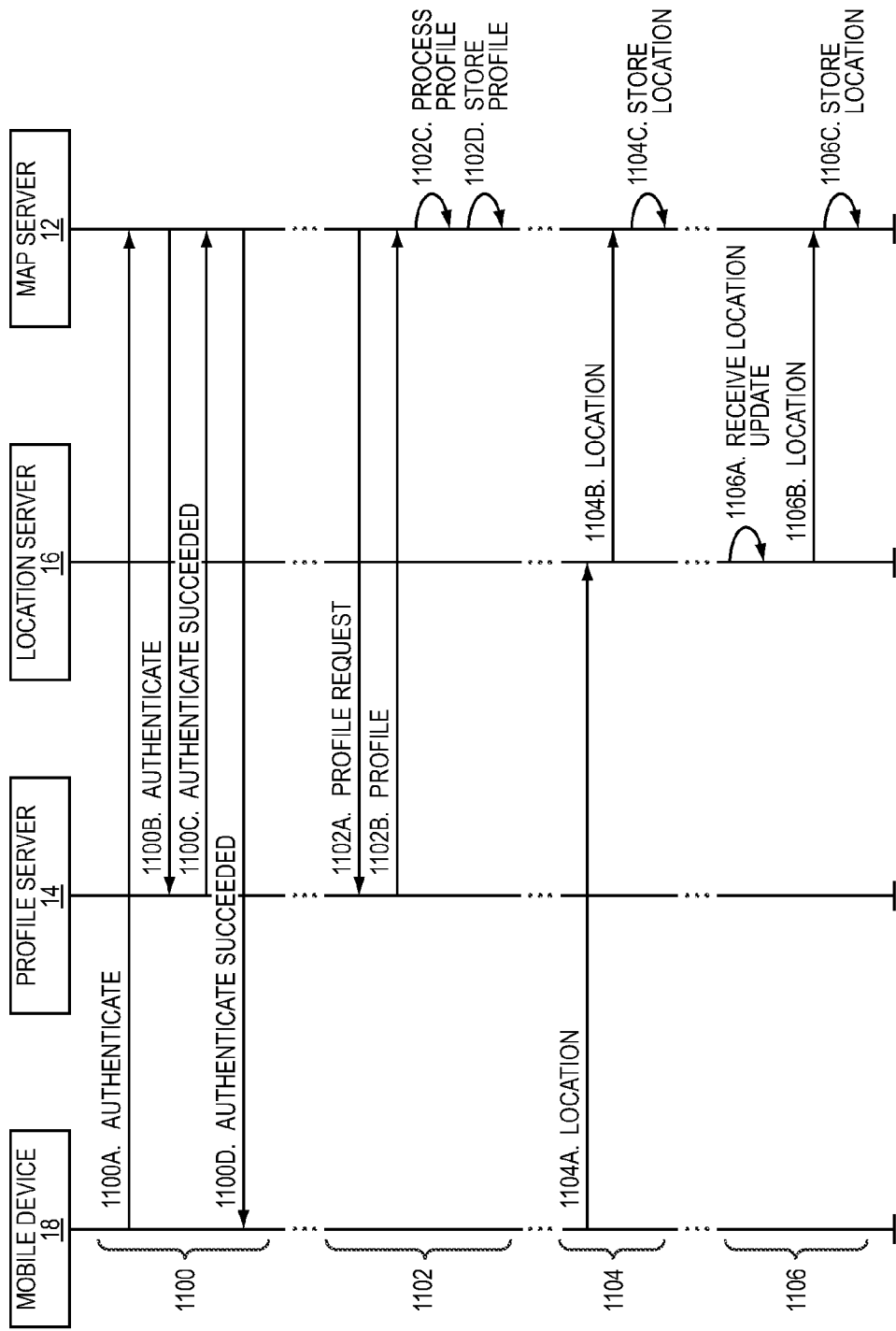
FIG. 5 illustrates the operation of the system of FIG. 1 to provide user profiles and current locations of the users of the mobile devices to the MAP server according to another embodiment of the present disclosure.

FIG. 5 illustrates the operation of the system 10 of FIG. 1 to provide the user profile of the user 20 of one of the mobile devices 18 to the MAP server 12 according to another embodiment of the present disclosure. This discussion is equally applicable to user profiles of the users 20 of the other mobile devices 18. First, an authentication process is performed (step 1100). For authentication, in this embodiment, the mobile device 18 authenticates with the MAP server 12 (step 1100A), and the MAP server 12 authenticates with the profile server 14 (step 1100B). Preferably, authentication is performed using OpenID or similar technology. However, authentication may alternatively be performed using separate credentials (e.g., username and password) of the user 20 for access to the MAP server 12 and the profile server 14. Assuming that authentication is successful, the profile server 14 returns an authentication succeeded message to the MAP server 12 (step 1100C), and the MAP server 12 returns an authentication succeeded message to the MAP client 30 of the mobile device 18 (step 1100D).

At some point after authentication is complete, a user profile process is performed such that a user profile of the user 20 is obtained from the profile server 14 and delivered to the MAP server 12 (step 1102). In this embodiment, the profile manager 52 of the MAP server 12 sends a profile request to the profile server 14 (step 1102A). In response, the profile server 14 returns the user profile of the user 20 to the profile manager 52 of the MAP server 12 (step 1102B). Note that while in this embodiment the profile server 14 returns the complete user profile of the user 20 to the MAP server 12, in an alternative embodiment, the profile server 14 may return a filtered version of the user profile of the user 20 to the MAP server 12. The profile server 14 may filter the user profile of the user 20 according to criteria specified by the user 20. For example, the user profile of the user 20 may include demographic information, general interests, music interests, and movie interests, and the user 20 may specify that the demographic information or some subset thereof is to be filtered, or removed, before sending the user profile to the MAP server 12.

Upon receiving the user profile of the user 20, the profile manager 52 of the MAP server 12 processes the user profile (step 1102C). More specifically, as discussed above, in the preferred embodiment, the profile manager 52 includes social network handlers for the social network services supported by the MAP server 12. The social network handlers process user profiles to generate user profiles for the MAP server 12 that include lists of keywords for each of a number of profile categories, or profile slices.

After processing the user profile of the user 20, the profile manager 52 of the MAP server 12 stores the resulting user profile for the user 20 (step 1102D). More specifically, in one embodiment, the MAP server 12 stores user records for the users 20 in the datastore 64 (FIG. 2). The user profile of the user 20 is stored in the user record of the user 20. The user record of the user 20 includes a unique identifier of the user 20, the user profile of the user 20, and, as discussed below, a current location of the user 20. Note that the user profile of the user 20 may be updated as desired. For example, in one embodiment, the user profile of the user 20 is updated by repeating step 1102 each time the user 20 activates the MAP application 32.

Note that while the discussion herein focuses on an embodiment where the user profiles of the users 20 are obtained from the one or more profile servers 14, the user profiles of the users 20 may be obtained in any desired manner. For example, in one alternative embodiment, the user 20 may identify one or more favorite websites. The profile manager 52 of the MAP server 12 may then crawl the one or more favorite websites of the user 20 to obtain keywords appearing in the one or more favorite websites of the user 20. These keywords may then be stored as the user profile of the user 20.

At some point, a process is performed such that a current location of the mobile device 18 and thus a current location of the user 20 is obtained by the MAP server 12 (step 1104). In this embodiment, the MAP application 32 of the mobile device 18 obtains the current location of the mobile device 18 from the location function 36 of the mobile device 18. The MAP application 32 then provides the current location of the user 20 of the mobile device 18 to the location server 16 (step 1104A). Note that step 1104A may be repeated periodically or in response to changes in the location of the mobile device 18 in order to provide location updates for the user 20 to the MAP server 12. The location server 16 then provides the current location of the user 20 to the MAP server 12 (step 1104B). The location server 16 may provide the current location of the user 20 to the MAP server 12 automatically in response to receiving the current location of the user 20 from the mobile device 18 or in response to a request from the MAP server 12.

In response to receiving the current location of the mobile device 18, the location manager 54 of the MAP server 12 stores the current location of the mobile device 18 as the current location of the user 20 (step 1104C). More specifically, in one embodiment, the current location of the user 20 is stored in the user record of the user 20 maintained in the datastore 64 of the MAP server 12. Note that, in the preferred embodiment, only the current location of the user 20 is stored in the user record of the user 20. In this manner, the MAP server 12 maintains privacy for the user 20 since the MAP server 12 does not maintain a historical record of the location of the user 20.

As discussed above, the use of the location server 16 is particularly beneficial when the mobile device 18 does not permit background processes. As such, if the mobile device 18 does not permit background processes, the MAP application 32 will not provide location updates for the user 20 to the location server 16 unless the MAP application 32 is active. However, other applications running on the mobile device 18 (or some other device of the user 20) may provide location updates to the location server 16 for the user 20 when the MAP application 32 is not active. This is illustrated in step 1106 where the location server 16 receives a location update for the user 20 from another application running on the mobile device 18 or an application running on another device of the user 20 (step 1106A). The location server 16 then provides the location update for the user 20 to the MAP server 12 (step 1106B). In response, the location manager 54 updates and stores the current location of the user 20 in the user record of the user 20 (step 1106C). In this manner, the MAP server 12 is enabled to obtain location updates for the user 20 even when the MAP application 32 is not active at the mobile device 18.

FIGS. 6A through 6D begin a discussion of the operation of the crowd analyzer 56 to form crowds of users according to one embodiment of the present disclosure. FIGS. 6A through 6D illustrate a flow chart for a spatial crowd formation process according to one embodiment of the present disclosure. In this embodiment, the spatial crowd formation process is triggered in response to receiving a location update for one of the users 20 and is preferably repeated for each location update received for the users 20. As such, first, the crowd analyzer 56 receives a location update, or a new location, for one of the users 20 (step 1200). In response, the crowd analyzer 56 retrieves an old location of the user 20, if any (step 1202). The old location is the current location of the user 20 prior to receiving the new location. The crowd analyzer 56 then creates a new bounding box of a predetermined size centered at the new location of the user 20 (step 1204) and an old bounding box of a predetermined size centered at the old location of the user 20, if any (step 1206). The predetermined size of the new and old bounding boxes may be any desired size. As one example, the predetermined size of the new and old bounding boxes is 40 meters by 40 meters. Note that if the user 20 does not have an old location (i.e., the location received in step 1200 is the first location received for the user 20), then the old bounding box is essentially null. Also note that while bounding "boxes" are used in this example, the bounding areas may be of any desired shape.

Next, the crowd analyzer 56 determines whether the new and old bounding boxes overlap (step 1208). If so, the crowd analyzer 56 creates a bounding box encompassing the new and old bounding boxes (step 1210). For example, if the new and old bounding boxes are 40×40 meter regions and a 1×1 meter square at the northeast corner of the new bounding box overlaps a 1×1 meter square at the southwest corner of the old bounding box, the crowd analyzer 56 may create a 79×79 meter square bounding box encompassing both the new and old bounding boxes.

The crowd analyzer 56 then determines the individual users and crowds relevant to the bounding box created in step 1210 (step 1212). The crowds relevant to the bounding box are crowds that are within or overlap the bounding box (e.g., have at least one user located within the bounding box). The individual users relevant to the bounding box are users that are currently located within the bounding box and not already part of a crowd. Next, the crowd analyzer 56 computes an optimal inclusion distance for individual users based on user density within the bounding box (step 1214). More specifically, in one embodiment, the optimal inclusion distance for individuals, which is also referred to herein as an initial optimal inclusion distance, is set according to the following equation:

$$\text{initial\_optimal\_inclusion\_dist} = a \cdot \sqrt{\frac{A_{BoundingBox}}{\text{number\_of\_users}}}, \quad \text{Eqn. (1)}$$

where a is a number between 0 and 1, $A_{BoundingBox}$ is an area of the bounding box, and number_of_users is the total number of users in the bounding box. The total number of users in the bounding box includes both individual users that are not already in a crowd and users that are already in a crowd. In one embodiment, a is ⅔.

The crowd analyzer 56 then creates a crowd for each individual user within the bounding box that is not already included in a crowd and sets the optimal inclusion distance for the crowds to the initial optimal inclusion distance (step 1216). At this point, the process proceeds to FIG. 6B where the crowd analyzer 56 analyzes the crowds relevant to the bounding box to determine whether any of the crowd members (i.e., users in the crowds) violate the optimal inclusion distance of their crowds (step 1218). Any crowd member that violates the optimal inclusion distance of his or her crowd is then removed from that crowd (step 1220). The crowd analyzer 56 then creates a crowd of one user for each of the users removed from their crowds in step 1220 and sets the optimal inclusion distance for the newly created crowds to the initial optimal inclusion distance (step 1222).

Next, the crowd analyzer 56 determines the two closest crowds for the bounding box (step 1224) and a distance between the two closest crowds (step 1226). The distance between the two closest crowds is the distance between the crowd centers of the two closest crowds. The crowd analyzer 56 then determines whether the distance between the two closest crowds is less than the optimal inclusion distance of a larger of the two closest crowds (step 1228). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 56 determines whether the distance between the two closest crowds is less than the optimal inclusion distances of both of the two closest crowds. As another alternative, if the two closest crowds are of the same size, the crowd analyzer 56 may compare the distance between the two closest crowds to an average of the optimal inclusion distances of the two closest crowds.

If the distance between the two closest crowds is not less than the optimal inclusion distance, then the process proceeds to step 1238. Otherwise, the two closest crowds are combined or merged (step 1230), and a new crowd center for the resulting crowd is computed (step 1232). A center of mass algorithm may be used to compute the crowd center of a crowd. In addition, a new optimal inclusion distance for the resulting crowd is computed (step 1234). In one embodiment, the new optimal inclusion distance for the resulting crowd is computed as:

$$\text{average} = \frac{1}{n+1} \cdot \left( \text{initial\_optimal\_inclusion\_dist} + \sum_{i=1}^{n} d_i \right), \quad \text{Eqn. (2)}$$

$$\text{optimal\_inclusion\_dist} = \text{average} + \sqrt{\left( \frac{1}{n} \cdot \sum_{i=1}^{n} (d_i - \text{average})^2 \right)} \quad \text{Eqn. (3)}$$

where n is the number of users in the crowd and $d_i$ is a distance between the ith user and the crowd center. In other words, the new optimal inclusion distance is computed as the average of the initial optimal inclusion distance and the distances between the users in the crowd and the crowd center plus one standard deviation.

At this point, the crowd analyzer 56 determines whether a maximum number of iterations have been performed (step 1236). The maximum number of iterations is a predefined number that ensures that the crowd formation process does not indefinitely loop over steps 1218 through 1234 or loop over steps 1218 through 1234 more than a desired maximum number of times. If the maximum number of iterations has not been reached, the process returns to step 1218 and is repeated until either the distance between the two closest crowds is not less than the optimal inclusion distance of the larger crowd or the maximum number of iterations has been reached. At that point, the crowd analyzer 56 discards crowds with less than three users, or members (step 1238), and the process ends.

Figure 6A:
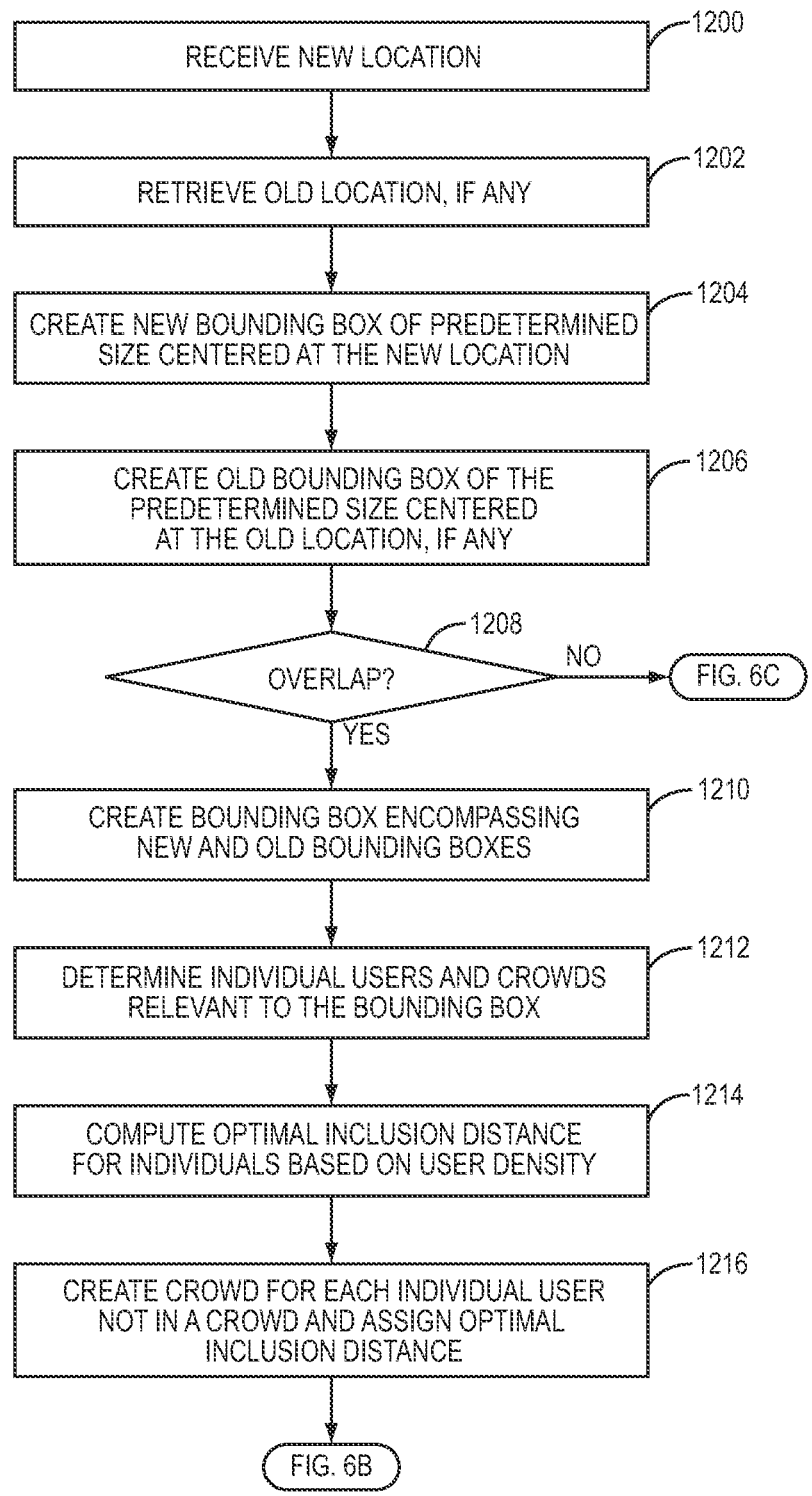
FIGS. 6A through 6D illustrate a flow chart for a spatial crowd formation process according to one embodiment of the present disclosure.
Figure 6B:
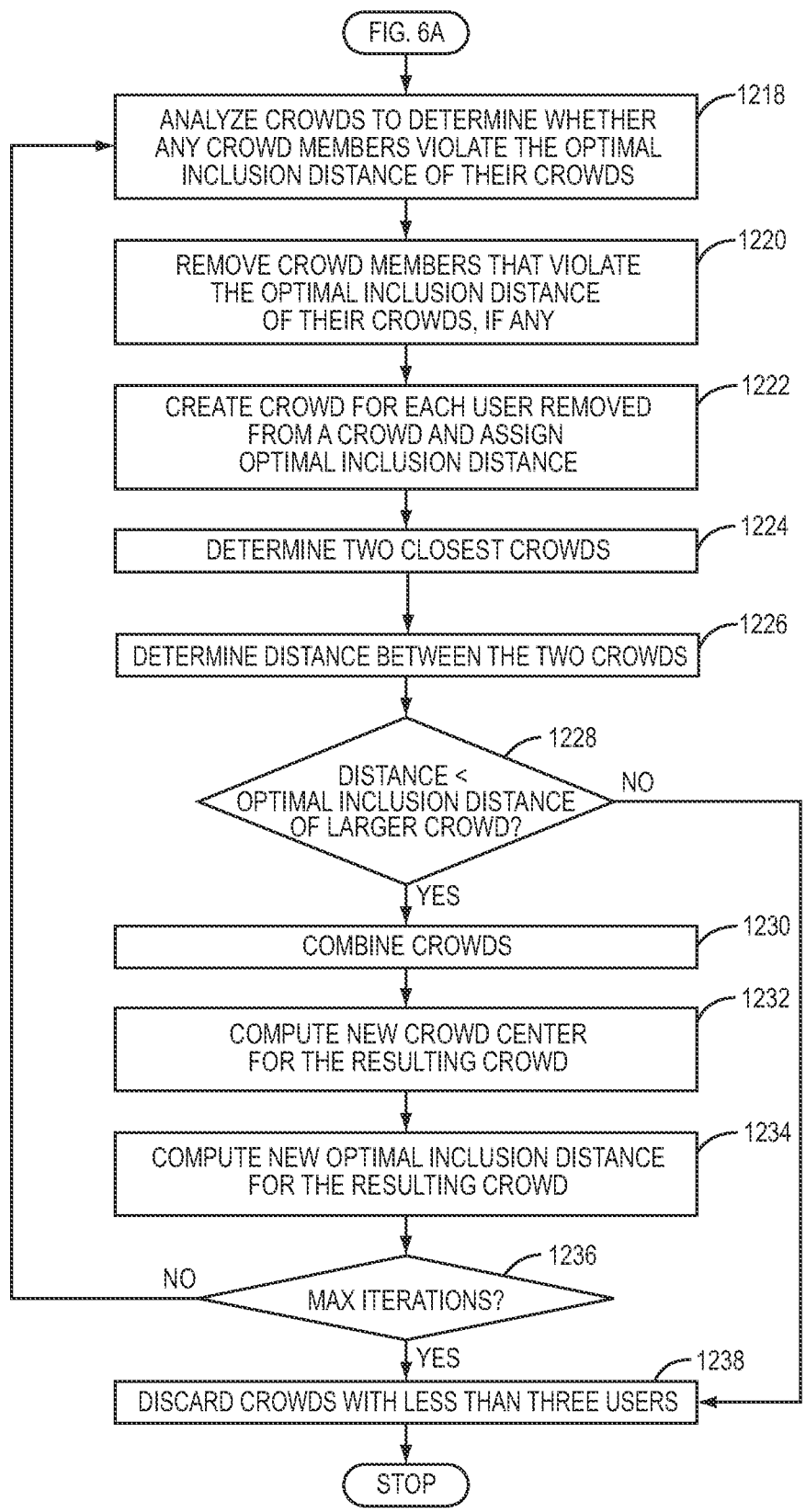
Figure 6C:
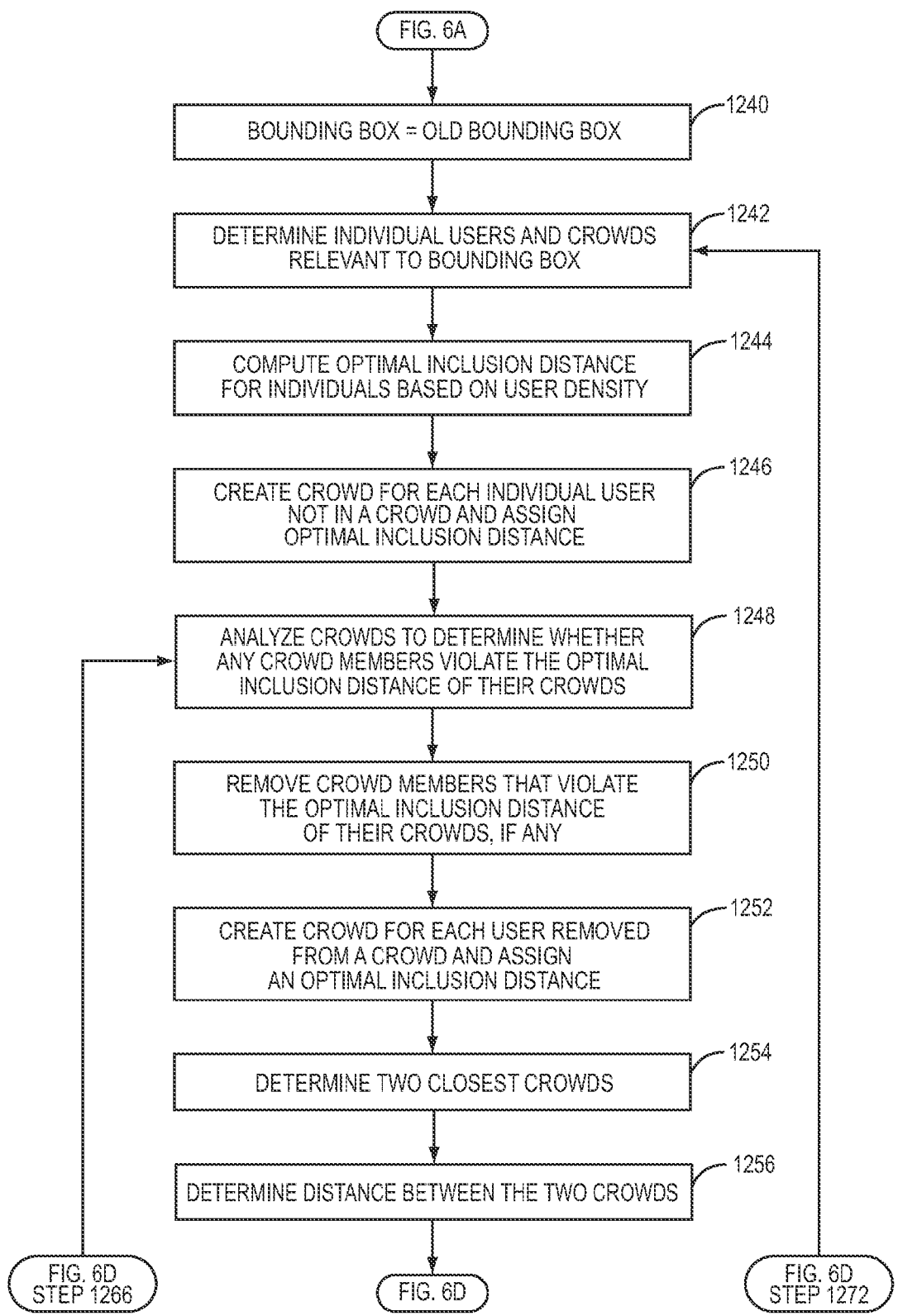
Figure 6D:
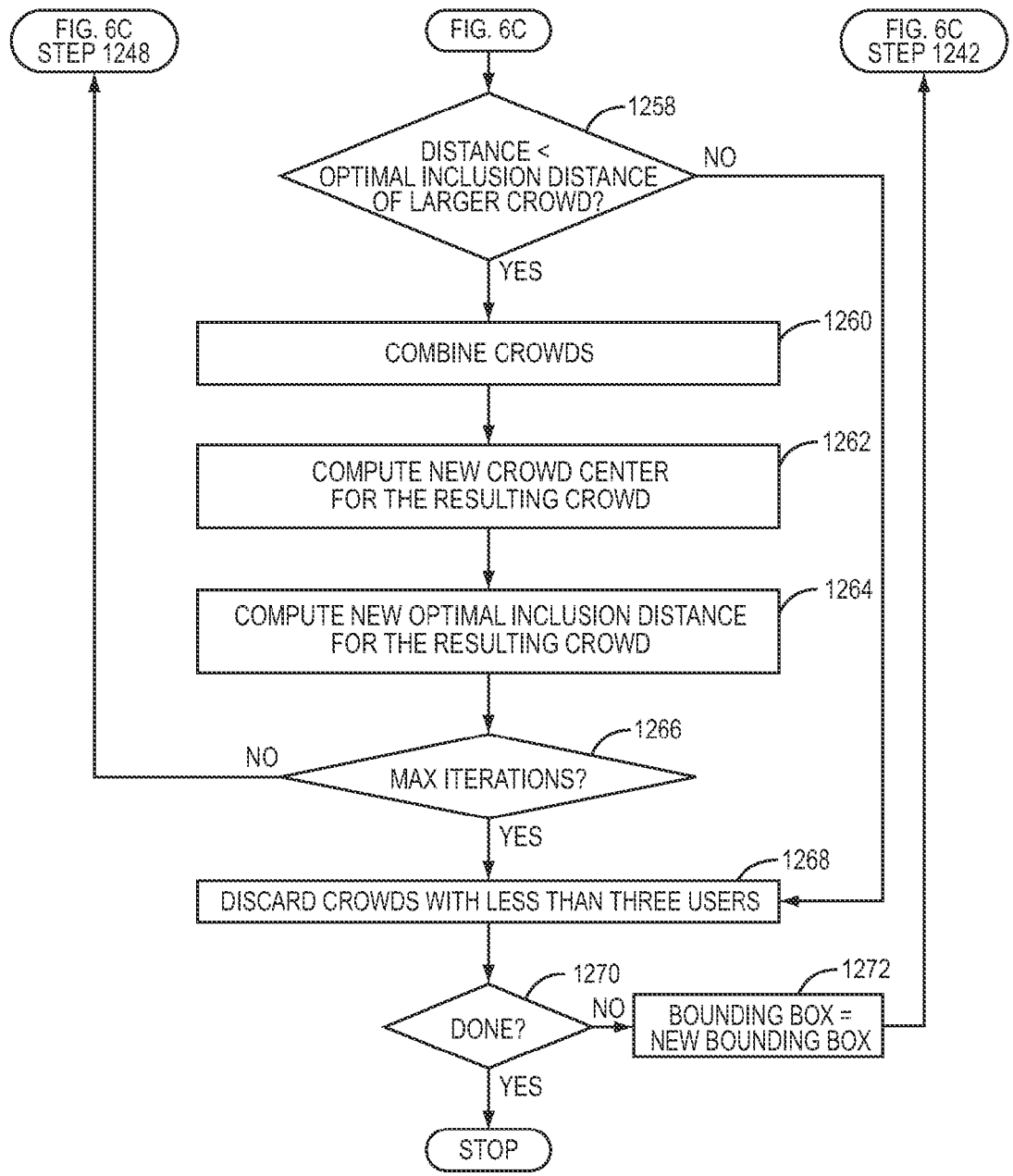

Returning to step 1208 in FIG. 6A, if the new and old bounding boxes do not overlap, the process proceeds to FIG. 6C and the bounding box to be processed is set to the old bounding box (step 1240). In general, the crowd analyzer 56 then processes the old bounding box in much the same manner as described above with respect to steps 1212 through 1238. More specifically, the crowd analyzer 56 determines the individual users and crowds relevant to the bounding box (step 1242). The crowds relevant to the bounding box are crowds that are within or overlap the bounding box (e.g., have at least one user located within the bounding box). The individual users relevant to the bounding box are users that are currently located within the bounding box and not already part of a crowd. Next, the crowd analyzer 56 computes an optimal inclusion distance for individual users based on user density within the bounding box (step 1244). More specifically, in one embodiment, the optimal inclusion distance for individuals, which is also referred to herein as an initial optimal inclusion distance, is set according to the following equation:

$$\text{initial\_optimal\_inclusion\_dist} = a \cdot \sqrt{\frac{A_{BoundingBox}}{\text{number\_of\_users}}}, \quad \text{Eqn. (4)}$$

where a is a number between 0 and 1, $A_{BoundingBox}$ is an area of the bounding box, and number_of_users is the total number of users in the bounding box. The total number of users in the bounding box includes both individual users that are not already in a crowd and users that are already in a crowd. In one embodiment, a is ⅔.

The crowd analyzer 56 then creates a crowd of one user for each individual user within the bounding box that is not already included in a crowd and sets the optimal inclusion distance for the crowds to the initial optimal inclusion distance (step 1246). At this point, the crowd analyzer 56 analyzes the crowds for the bounding box to determine whether any crowd members (i.e., users in the crowds) violate the optimal inclusion distance of their crowds (step 1248). Any crowd member that violates the optimal inclusion distance of his or her crowd is then removed from that crowd (step 1250). The crowd analyzer 56 then creates a crowd of one user for each of the users removed from their crowds in step 1250 and sets the optimal inclusion distance for the newly created crowds to the initial optimal inclusion distance (step 1252).

Next, the crowd analyzer 56 determines the two closest crowds in the bounding box (step 1254) and a distance between the two closest crowds (step 1256). The distance between the two closest crowds is the distance between the crowd centers of the two closest crowds. The crowd analyzer 56 then determines whether the distance between the two closest crowds is less than the optimal inclusion distance of a larger of the two closest crowds (step 1258). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 56 determines whether the distance between the two closest crowds is less than the optimal inclusion distances of both of the two closest crowds. As another alternative, if the two closest crowds are of the same size, the crowd analyzer 56 may compare the distance between the two closest crowds to an average of the optimal inclusion distances of the two closest crowds.

If the distance between the two closest crowds is not less than the optimal inclusion distance, the process proceeds to step 1268. Otherwise, the two closest crowds are combined or merged (step 1260), and a new crowd center for the resulting crowd is computed (step 1262). Again, a center of mass algorithm may be used to compute the crowd center of a crowd. In addition, a new optimal inclusion distance for the resulting crowd is computed (step 1264). As discussed above, in one embodiment, the new optimal inclusion distance for the resulting crowd is computed as:

$$\text{average} = \frac{1}{n+1} \cdot \left(\text{initial\_optimal\_inclusion\_dist} + \sum_{i=1}^{n} d_i\right), \quad \text{Eqn. (5)}$$

$$\text{optimal\_inclusion\_dist} = \text{average} + \sqrt{\left(\frac{1}{n} \cdot \sum_{i=1}^{n} (d_i - \text{average})^2\right)} \quad \text{Eqn. (6)}$$

where n is the number of users in the crowd and $d_i$ is a distance between the ith user and the crowd center. In other words, the new optimal inclusion distance is computed as the average of the initial optimal inclusion distance and the distances between the users in the crowd and the crowd center plus one standard deviation.

At this point, the crowd analyzer 56 determines whether a maximum number of iterations have been performed (step 1266). If the maximum number of iterations has not been reached, the process returns to step 1248 and is repeated until either the distance between the two closest crowds is not less than the optimal inclusion distance of the larger crowd or the maximum number of iterations has been reached. At that point, the crowd analyzer 56 discards crowds with less than three users, or members (step 1268). The crowd analyzer 56 then determines whether the crowd formation process for the new and old bounding boxes is done (step 1270). In other words, the crowd analyzer 56 determines whether both the new and old bounding boxes have been processed. If not, the bounding box is set to the new bounding box (step 1272), and the process returns to step 1242 and is repeated for the new bounding box. Once both the new and old bounding boxes have been processed, the crowd formation process ends.

Figure 7A:
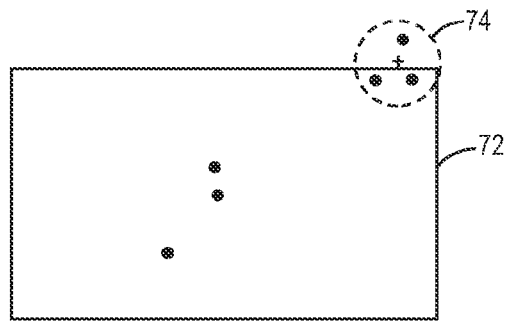
Figure 7B:
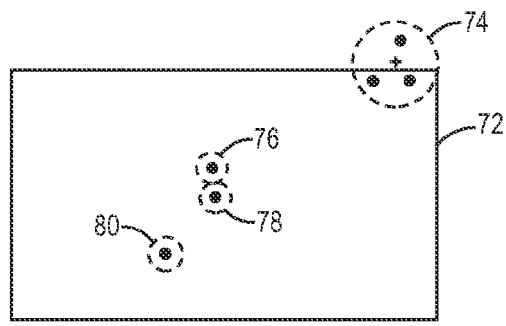

FIGS. 7A through 7D graphically illustrate the crowd formation process of FIGS. 6A through 6D for a scenario where the crowd formation process is triggered by a location update for a user having no old location. In this scenario, the crowd analyzer 56 creates a new bounding box 72 for the new location of the user, and the new bounding box 72 is set as the bounding box to be processed for crowd formation. Then, as illustrated in FIG. 7A, the crowd analyzer 56 identifies all individual users currently located within the new bounding box 72 and all crowds located within or overlapping the new bounding box 72. In this example, crowd 74 is an existing crowd relevant to the new bounding box 72. Crowds are indicated by dashed circles, crowd centers are indicated by cross-hairs (+), and users are indicated as dots. Next, as illustrated in FIG. 7B, the crowd analyzer 56 creates crowds 76 through 80 of one user for the individual users, and the optimal inclusion distances of the crowds 76 through 80 are set to the initial optimal inclusion distance. As discussed above, the initial optimal inclusion distance is computed by the crowd analyzer 56 based on a density of users within the new bounding box 72.

Figure 7C:
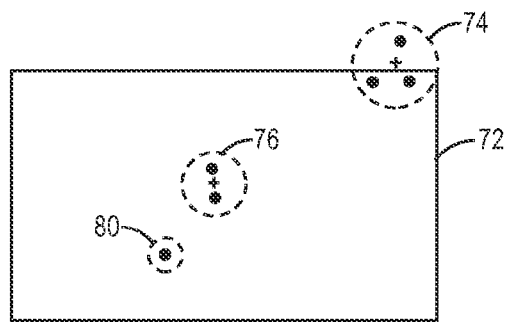
Figure 7D:
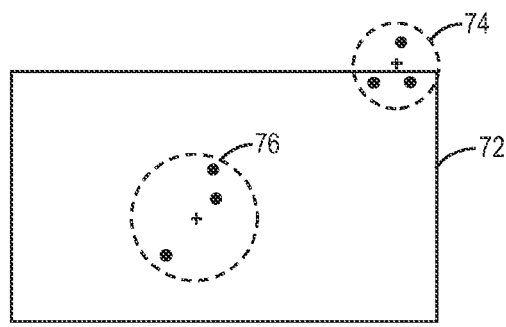

The crowd analyzer 56 then identifies the two closest crowds 76 and 78 in the new bounding box 72 and determines a distance between the two closest crowds 76 and 78. In this example, the distance between the two closest crowds 76 and 78 is less than the optimal inclusion distance. As such, the two closest crowds 76 and 78 are merged and a new crowd center and new optimal inclusion distance are computed, as illustrated in FIG. 7C. The crowd analyzer 56 then repeats the process such that the two closest crowds 76 and 80 in the new bounding box 72 are again merged, as illustrated in FIG. 7D. At this point, the distance between the two closest crowds 74 and 76 is greater than the appropriate optimal inclusion distance. As such, the crowd formation process is complete.

Figure 8A:
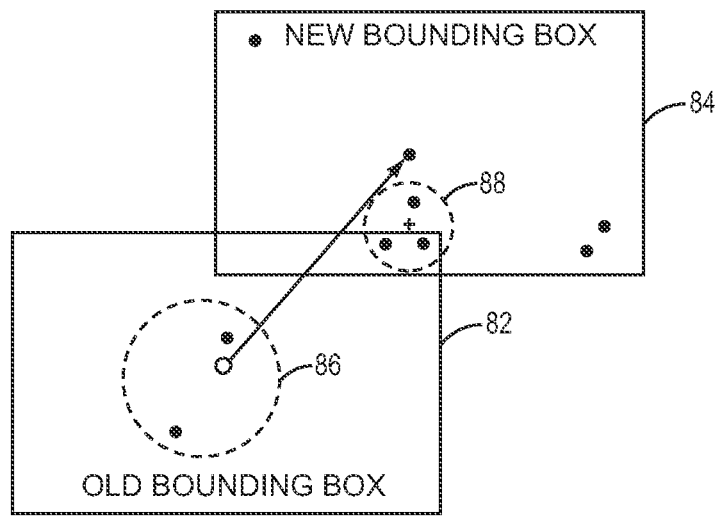

FIGS. 8A through 8F graphically illustrate the crowd formation process of FIGS. 6A through 6D for a scenario where the new and old bounding boxes overlap. As illustrated in FIG. 8A, a user moves from an old location to a new location, as indicated by an arrow. The crowd analyzer 56 receives a location update for the user giving the new location of the user. In response, the crowd analyzer 56 creates an old bounding box 82 for the old location of the user and a new bounding box 84 for the new location of the user. Crowd 86 exists in the old bounding box 82, and crowd 88 exists in the new bounding box 84.

Figure 8B:
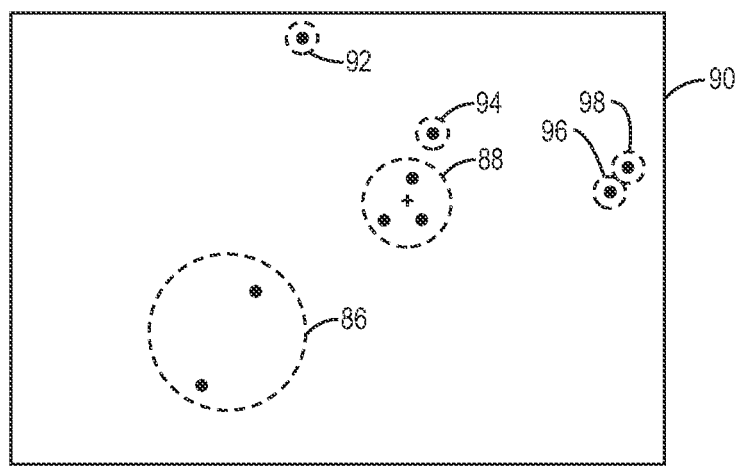

Since the old bounding box 82 and the new bounding box 84 overlap, the crowd analyzer 56 creates a bounding box 90 that encompasses both the old bounding box 82 and the new bounding box 84, as illustrated in FIG. 8B. In addition, the crowd analyzer 56 creates crowds 92 through 98 for individual users currently located within the bounding box 90. The optimal inclusion distances of the crowds 92 through 98 are set to the initial optimal inclusion distance computed by the crowd analyzer 56 based on the density of users in the bounding box 90.

Figure 8C:
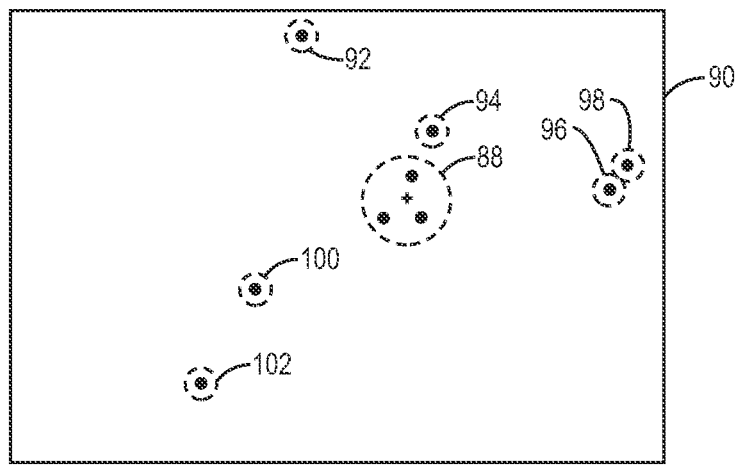

Next, the crowd analyzer 56 analyzes the crowds 86, 88, and 92 through 98 to determine whether any members of the crowds 86, 88, and 92 through 98 violate the optimal inclusion distances of the crowds 86, 88, and 92 through 98. In this example, as a result of the user leaving the crowd 86 and moving to his new location, both of the remaining members of the crowd 86 violate the optimal inclusion distance of the crowd 86. As such, the crowd analyzer 56 removes the remaining users from the crowd 86 and creates crowds 100 and 102 of one user each for those users, as illustrated in FIG. 8C.

Figure 8D:
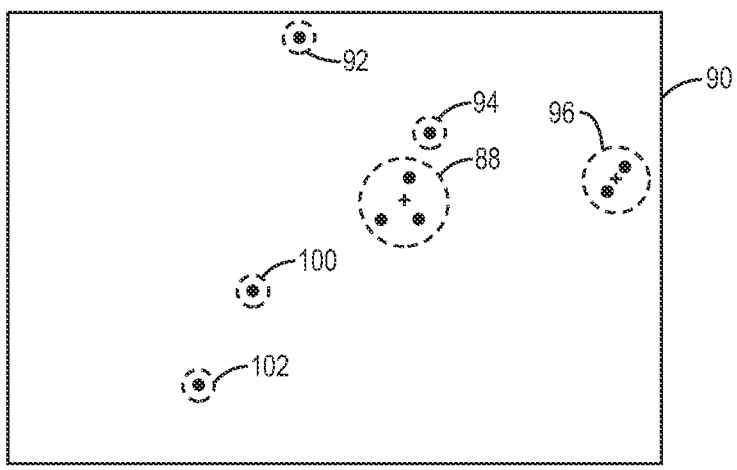

The crowd analyzer 56 then identifies the two closest crowds in the bounding box 90, which in this example are the crowds 96 and 98. Next, the crowd analyzer 56 computes a distance between the two crowds 96 and 98. In this example, the distance between the two crowds 96 and 98 is less than the initial optimal inclusion distance and, as such, the two crowds 96 and 98 are combined. In this example, crowds are combined by merging the smaller crowd into the larger crowd. Since the two crowds 96 and 98 are of the same size, the crowd analyzer 56 merges the crowd 98 into the crowd 96, as illustrated in FIG. 8D. A new crowd center and new optimal inclusion distance are then computed for the crowd 96.

Figure 8E:
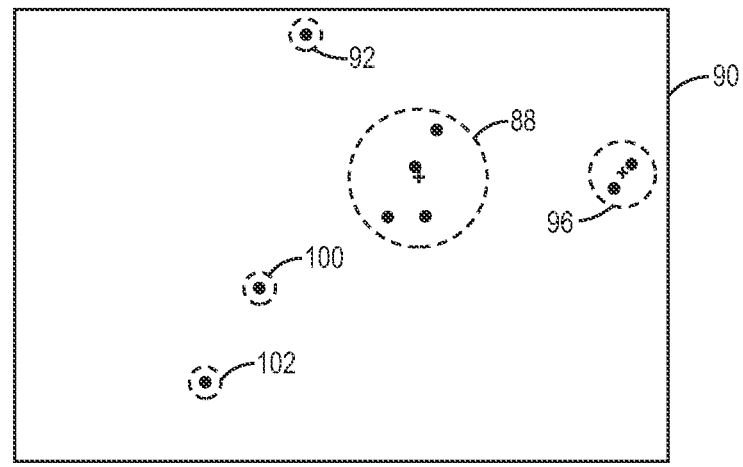
Figure 8F:
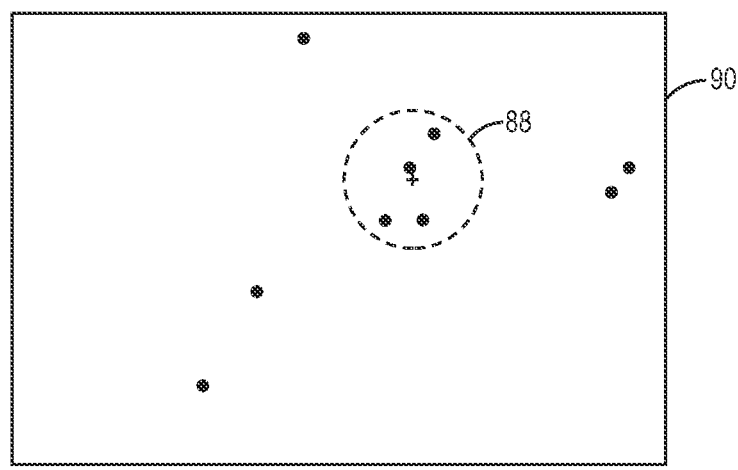

At this point, the crowd analyzer 56 repeats the process and determines that the crowds 88 and 94 are now the two closest crowds. In this example, the distance between the two crowds 88 and 94 is less than the optimal inclusion distance of the larger of the two crowds 88 and 94, which is the crowd 88. As such, the crowd 94 is merged into the crowd 88 and a new crowd center and optimal inclusion distance are computed for the crowd 88, as illustrated in FIG. 8E. At this point, there are no two crowds closer than the optimal inclusion distance of the larger of the two crowds. As such, the crowd analyzer 56 discards any crowds having less than three members, as illustrated in FIG. 8F. In this example, the crowds 92, 96, 100, and 102 have less than three members and are therefore removed. The crowd 88 has three or more members and, as such, is not removed. At this point, the crowd formation process is complete.

Figure 9A:
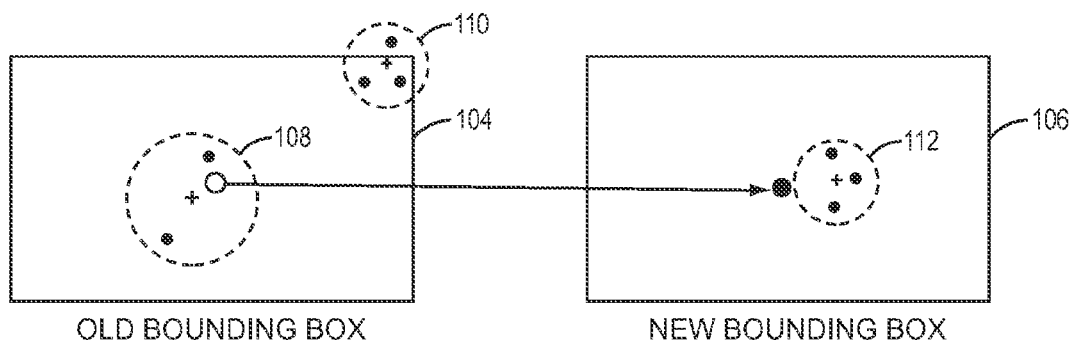

FIGS. 9A through 9E graphically illustrate the crowd formation process of FIGS. 6A through 6D in a scenario where the new and old bounding boxes do not overlap. As illustrated in FIG. 9A, in this example, a user moves from an old location to a new location. The crowd analyzer 56 creates an old bounding box 104 for the old location of the user and a new bounding box 106 for the new location of the user. Crowds 108 and 110 exist in the old bounding box 104, and crowd 112 exists in the new bounding box 106. In this example, since the old and new bounding boxes 104 and 106 do not overlap, the crowd analyzer 56 processes the old and new bounding boxes 104 and 106 separately.

Figure 9B:
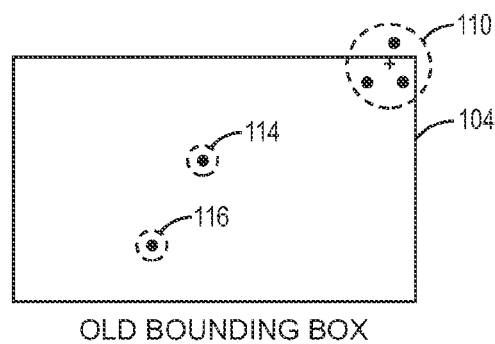
Figure 9C:
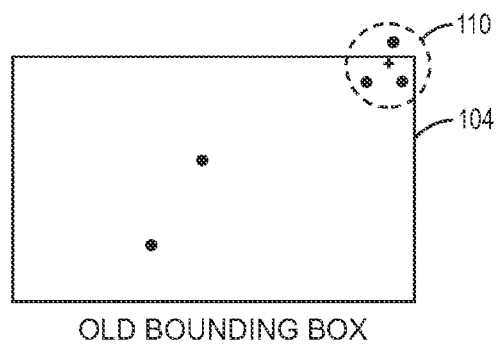

More specifically, as illustrated in FIG. 9B, as a result of the movement of the user from the old location to the new location, the remaining users in the crowd 108 no longer satisfy the optimal inclusion distance for the crowd 108. As such, the remaining users in the crowd 108 are removed from the crowd 108, and crowds 114 and 116 of one user each are created for the removed users as shown in FIG. 9B. In this example, no two crowds in the old bounding box 104 are close enough to be combined. As such, crowds having less than three users are removed as shown in FIG. 9C, and processing of the old bounding box 104 is complete, and the crowd analyzer 56 proceeds to process the new bounding box 106.

Figure 9D:
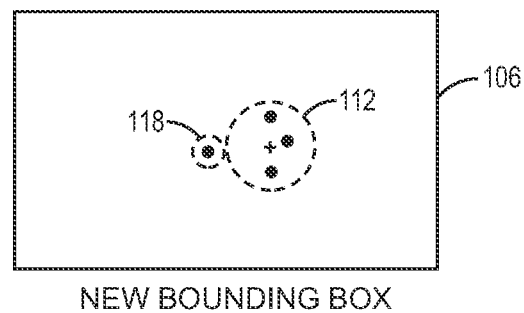
Figure 9E:
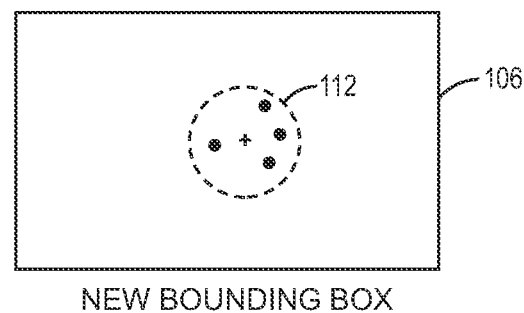

As illustrated in FIG. 9D, processing of the new bounding box 106 begins by the crowd analyzer 56 creating a crowd 118 of one user for the user. The crowd analyzer 56 then identifies the crowds 112 and 118 as the two closest crowds in the new bounding box 106 and determines a distance between the two crowds 112 and 118. In this example, the distance between the two crowds 112 and 118 is less than the optimal inclusion distance of the larger crowd, which is the crowd 112. As such, the crowd analyzer 56 combines the crowds 112 and 118 by merging the crowd 118 into the crowd 112, as illustrated in FIG. 9E. A new crowd center and new optimal inclusion distance are then computed for the crowd 112. At this point, the crowd formation process is complete. Note that the crowd formation processes described above with respect to FIGS. 6A through 9E are exemplary. The present disclosure is not limited thereto. Any type of crowd formation process may be used.

Up until this point, the disclosure has focused primarily on crowd formation. The following discussion describes various processes by which the MAP server 12 utilizes micro-blog posts made by the users 20 to provide crowd-based features. More specifically, FIG. 10 illustrates the operation of the system 10 wherein the MAP server 12 monitors micro-blog posts made by the users 20 according to one embodiment of the present disclosure. As illustrated, in this embodiment, the micro-blog processing function 60 of the MAP server 12 registers the MAP server 12 as a follower of the users 20 of the MAP server 12 (step 1300). Notably, while the MAP server 12 is preferably registered as a follower of all of the users 20, the present disclosure is not limited thereto. The MAP server 12 may only be registered as a follower of some of the users 20. For example, not all of the users 20 may be users of the micro-blogging service 26 in which case the MAP server 12 may only be registered as followers of those users 20 that are also users of the micro-blogging service 26. As another example, even those users 20 that are also users of the micro-blogging service 26 may be enabled to either opt-in or opt-out of the feature of the MAP server 12 that enables the MAP server 12 to register as a follower of those users 20.

Next, the mobile device 18-1 sends a micro-blog post made by the user 20-1 to the micro-blogging service 26 (step 1302). More specifically, in one embodiment, the user 20-1 may create and send the micro-blog post via a client application of the micro-blogging service 26 executed by the mobile device 18-1. In another embodiment, the MAP application 32-1 of the mobile device 18-1 may include a micro-blog feature that enables the user 20-1 to create and send a micro-blog post to the micro-blogging service 26 via the MAP application 32-1. In response to receiving the micro-blog post, the micro-blogging service 26 publishes the micro-blog post to followers of the user 20-1. As part of this publication process, the micro-blog post is sent to the MAP server 12, which is registered as a follower of the user 18-1 (step 1304).

In response to receiving the micro-blog post, the micro-blog processing function 60 of the MAP server 12 processes the micro-blog post to provide a crowd-based feature (step 1306). More specifically, as discussed below in detail, the micro-blog processing function 60 may identify any hashtags included in the micro-blog post. Then, if the micro-blog post includes one or more hashtags, the micro-blog processing function 60 provides a crowd-based feature based on the hashtag(s). For example, a hashtag may be determined to be representative of an interest of the crowd in which the user 20-1 is located and therefore recorded as an interest of the crowd. As another example, a hashtag may be determined to be indicative of a rating of the crowd in which the user 20-1 is located and therefore utilized to update the rating of the crowd. As yet another example, the hashtag may be determined to be one of a number of predefined action words (e.g., #crowdtag, #untagcrowd, #ratecrowd, #createcrowd, or the like), and a corresponding action may be taken by the micro-blog processing function 60.

In a similar manner, the micro-blog processing function 60 processes micro-blog posts from the other users 20. More specifically, using the user 20-N as an example, the mobile device 18-N sends a micro-blog post made by the user 20-N to the micro-blogging service 26 (step 1308). In response to receiving the micro-blog post, the micro-blogging service 26 publishes the micro-blog post to followers of the user 20-N. As part of this publication process, the micro-blog post is sent to the MAP server 12, which is registered as a follower of the user 20-N (step 1310). In response to receiving the micro-blog post, the micro-blog processing function 60 of the MAP server 12 processes the micro-blog post to provide a crowd-based feature, as described above (step 1312). The process of FIG. 10 may be repeated to continually monitor micro-blog posts of the users 20 and to provide crowd-based features based thereon.

FIG. 11 illustrates the operation of the system 10 wherein the MAP server 12 monitors micro-blog posts made by the users 20 according to another embodiment of the present disclosure. This embodiment is similar to that of FIG. 10. As illustrated, in this embodiment, the mobile device 18-1 sends a micro-blog post made by the user 20-1 to the MAP server 12 (step 1400). More specifically, in one embodiment, the MAP application 32-1 of the mobile device 18-1 includes a micro-blog feature that enables the user 20-1 to create and send a micro-blog post to the MAP server 12 for delivery to the micro-blogging service 26. In response to receiving the micro-blog post, the micro-blog processing function 60 of the MAP server 12 sends the micro-blog post to the micro-blogging service 26 (step 1402). In addition, the micro-blog processing function 60 of the MAP server 12 processes the micro-blog post to provide a crowd-based feature (step 1404). Lastly, in response to receiving the micro-blog post from the MAP server 12, the micro-blogging service 26 publishes the micro-blog post to followers of the user 20-1 (step 1406).

In a similar manner, the micro-blog processing function 60 processes micro-blog posts from the other users 20. More specifically, using the user 20-N as an example, the mobile device 18-N sends a micro-blog post made by the user 20-N to the MAP server 12 (step 1408). In response to receiving the micro-blog post, the micro-blog processing function 60 of the MAP server 12 sends the micro-blog post to the micro-blogging service 26 (step 1410). In addition, the micro-blog processing function 60 of the MAP server 12 processes the micro-blog post to provide a crowd-based feature (step 1412). In response to receiving the micro-blog post from the MAP server 12, the micro-blogging service 26 publishes the micro-blog post to followers of the user 20-N (step 1414). The process of FIG. 11 may be repeated to continually monitor micro-blog posts of the users 20 and to provide crowd-based features based thereon.

FIG. 12 illustrates the operation of the micro-blog processing function 60 of the MAP server 12 to process micro-blog posts made by the users 20 to provide a crowd-based feature according to one embodiment of the present disclosure. First, the micro-blog processing function 60 receives a micro-blog post made by one of the users 20 (step 1500). As discussed above, in one embodiment, the micro-blog processing function 60 receives the micro-blog post from the micro-blogging service 26. In another embodiment, the micro-blog processing function 60 receives the micro-blog post from the mobile device 18 of the user 20. Next, the micro-blog processing function 60 determines whether the micro-blog post includes any hashtags (step 1502). If not, the process proceeds to step 1516.

If the micro-blog post includes one or more hashtags, the micro-blog processing function 60 gets the first hashtag of the one or more hashtags in the micro-blog post (step 1504). The micro-blog processing function 60 then determines whether the hashtag is representative of an interest of the crowd (step 1506). More specifically, the micro-blog processing function 60 determines whether the hashtag is representative of an interest of the crowd based on one or more predefined rules that define an extent to which a hashtag must be used by the users in a crowd before the hashtag is determined to be representative of an interest of the crowd. For example, the hashtag may be determined to be representative of an interest of the crowd if usage of the hashtag by the users in the crowd exceeds a predefined threshold amount of usage. As a more specific example, the hashtag may be determined to be representative of an interest of the crowd if the hashtag has been used by the users in the crowd at least a predefined threshold number of times (e.g., 5 times) over a predefined amount of time (e.g., over the last 4 hours). Notably, the hashtag, a timestamp of the micro-blog post, and/or a user ID of the user 20 that sent the micro-blog post may be stored for future use. If the micro-blog processing function 60 determines that the hashtag is not representative of an interest of the crowd, the process proceeds to step 1512.

If the micro-blog processing function 60 determines that the hashtag is representative of an interest of the crowd, the micro-blog processing function 60 assigns a weight to the hashtag (step 1508). Notably, step 1508 is optional. The weight assigned to the hashtag may be a system-defined weight assigned to all hashtags identified as being representative of interests of corresponding crowds in order to distinguish interests inferred from hashtags appearing in micro-blog posts made by the users 20 in the crowds from interests explicitly defined by the users 20. Alternatively, the weight assigned to the hashtag may be a function of criteria such as, for example, an extent to which the hashtag has been used by the users in the crowd (e.g., ratio of the number of users in the crowd that have included the hashtag in one or more of their micro-blog posts over a total number of users in the crowd).

The hashtag along with the weight assigned to the hashtag are recorded as an interest of the crowd (step 1510). In one embodiment, the hashtag, along with the weight assigned to the hashtag if any, are stored in a profile of the crowd. In one embodiment, the profile of the crowd is an aggregate profile of the crowd generated based on the user profiles of the users 20 in the crowd. More specifically, the aggregate profile includes a list of interests appearing in the user profiles of the users 20 in the crowd. In addition, the aggregate profile may include, for each interest, a number of occurrences of the interest in the user profiles of the users 20 in the crowd, a total number of users in the crowd, and/or a ratio of the number of occurrences of the interest in the user profiles of the users 20 in the crowd over the total number of users in the crowd. In this case, the hashtag, and optionally the weight assigned to the hashtag, may be added to the list of keywords included in the aggregate profile of the crowd. In an alternative embodiment, the aggregate profile may be generated for the crowd, and the hashtag may be added to a supplemental profile of the crowd that is separate from the aggregate profile of the crowd and that includes a list of hashtags that have been identified as interests of the crowd and, optionally, the weights assigned to the hashtags. This supplemental profile may be referred to as a "conversation profile" that dynamically reflects topics being discussed by the crowd.

Next, the micro-blog processing function 60 determines whether the last hashtag in the micro-blog post has been processed (step 1512). If not, the micro-blog processing function 60 gets the next hashtag in the micro-blog post (step 1514), and the process returns to step 1506. Once the last hashtag in the micro-blog post has been processed, the micro-blog processing function 60 removes any hashtags that have aged-out from the profile of the crowd (step 1516). More specifically, in one embodiment, the micro-blog processing function 60 re-evaluates each hashtag recorded as an interest of the crowd (other than possibly the hashtag(s) just added) using the same rule(s) used for step 1506) and removes any hashtags that no longer satisfy those rules. In this manner, the hashtags listed as interests of the crowd are dynamic in that they do not remain recorded as interests of the crowd in perpetuity once they have been recorded as an interest of the crowd. Rather, as the hashtags used by the crowd change, so do the hashtags recorded as interests of the crowd. At this point, the process then returns to step 1500 and is repeated for subsequently received micro-blog posts.

FIG. 13 illustrates the operation of the micro-blog processing function 60 of the MAP server 12 to process micro-blog posts made by the users 20 to provide a crowd-based feature according to another embodiment of the present disclosure. First, the micro-blog processing function 60 receives a micro-blog post made by one of the users 20 (step 1600). As discussed above, in one embodiment, the micro-blog processing function 60 receives the micro-blog post from the micro-blogging service 26. In another embodiment, the micro-blog processing function 60 receives the micro-blog post from the mobile device 18 of the user 20. Next, the micro-blog processing function 60 determines whether the micro-blog post includes any hashtags (step 1602). If not, the process returns to step 1600 and is repeated for a subsequently received micro-blog post.

If the micro-blog post includes one or more hashtags, the micro-blog processing function 60 gets the first hashtag of the one or more hashtags in the micro-blog post (step 1604). The micro-blog processing function 60 then determines whether the hashtag is indicative of a rating of the crowd in which the user 20 is located by the user 20 (step 1606). More specifically, in this embodiment, the micro-blog processing function 60 determines whether the hashtag reflects that the user 20 likes or dislikes the crowd in which the user 20 is located and, optionally, a degree to which the user 20 likes or dislikes the crowd in which the user 20 is located. For example, if the hashtag includes a word such as good, best, or greatest along with the word crowd, the micro-blog processing function 60 may determine that the user 20 likes the crowd in which the user 20 is located and, optionally, a degree to which the user 20 likes the crowd in which the user 20 is located. Similarly, if the hashtag includes a word such as bad or worst along with the word crowd, the micro-blog processing function 60 may determine that the user 20 dislikes the crowd in which the user 20 is located and, optionally, a degree to which the user 20 dislikes the crowd in which the user 20 is located. For example, the hashtag of "#bestcrowdever" may be determined to be indicative of the user 20 liking the crowd to a highest degree. If the hashtag is not indicative of a rating of the crowd by the user 20, the process proceeds to step 1610.

If the hashtag is indicative of a rating of the crowd by the user 20, the micro-blog processing function 60 updates a crowd rating of the crowd in which the user 20 is located (step 1608). If the hashtag is indicative of the user 20 liking the crowd, then the crowd rating of the crowd is increased accordingly. Similarly, if the hashtag is indicative of the user 20 disliking the crowd, then the crowd rating of the crowd is decreased accordingly. As an example, the micro-blog processing function 60 may sort such hashtags by positive versus negative connotation and then provide a corresponding "thumbs up" or "thumbs down" rating. Alternatively, the micro-blog processing function 60 may sort such hashtags along a more granular spectrum of connotation (e.g., worst/bad/neutral/good/best). As yet another alternative, the micro-blog processing function 60 may store such hashtags, or the corresponding micro-blog posts including the hashtags, and subsequently enable users to view the hashtags/micro-blog posts as a means to determine a suitability of the crowd.

Next, the micro-blog processing function 60 determines whether the last hashtag in the micro-blog post has been processed (step 1610). If not, the micro-blog processing function 60 gets the next hashtag in the micro-blog post (step 1612), and the process returns to step 1606. Once the last hashtag in the micro-blog post has been processed, the process returns to step 1600 and is repeated for subsequently received micro-blog posts.

FIG. 14 illustrates the operation of the micro-blog processing function 60 of the MAP server 12 to process micro-blog posts made by the users 20 to provide a crowd-based feature according to yet another embodiment of the present disclosure. First, the micro-blog processing function 60 receives a micro-blog post made by one of the users 20 (step 1700). As discussed above, in one embodiment, the micro-blog processing function 60 receives the micro-blog post from the micro-blogging service 26. In another embodiment, the micro-blog processing function 60 receives the micro-blog post from the mobile device 18 of the user 20. Next, the micro-blog processing function 60 determines whether the micro-blog post includes any hashtags (step 1702). If not, the process returns to step 1700 and is repeated for a subsequently received micro-blog post.

If the micro-blog post includes one or more hashtags, the micro-blog processing function 60 gets the first hashtag of the one or more hashtags in the micro-blog post (step 1704). The micro-blog processing function 60 then determines whether the hashtag is one of a number of predefined action words (step 1706). More specifically, in one embodiment, the micro-blog processing function 60 stores a list of one or more predefined action words. For each predefined action word, the micro-blog processing function 60 is enabled to perform a corresponding action upon detecting the action word in a hashtag of a micro-blog post. In other words, an action word is a "reserved" hashtag that indicates to the micro-blog processing function 60 that a corresponding action is to be performed. Some exemplary action words are: #crowdtag, #ratecrowd, #untagcrowd, and #createcrowd, each of which is described in detail below. If the hashtag is not one of the predefined action words, then the process proceeds to step 1710.

If the hashtag is one of the predefined action words, the micro-blog processing function 60 performs a corresponding crowd-based action (step 1708). One of ordinary skill in the art will appreciate that the number of possible action words and corresponding crowd-based actions are numerous. While not to be limited to any specific action words or corresponding crowd-based actions, as discussed above, some exemplary action words are #crowdtag, #ratecrowd, #untagcrowd, and #createcrowd. For the action word #crowdtag, the corresponding crowd-based action is to tag the crowd of the user 20 with one or more keywords or interests included in the micro-blog post. In one embodiment, the one or more keywords or interests immediately follow the action word #crowdtag in the micro-blog post and may be expressed as text or as additional hashtags. In another embodiment, the one or more keywords or interests with which to tag the crowd of the user 20 are other hashtags that are not action words and that can be found anywhere in the micro-blog post. The crowd may be tagged with the one or more keywords or interests by adding the one or more keywords or interests to a profile of the crowd (e.g., the aggregate profile of the crowd or a supplemental profile of the crowd).

As an example, if the micro-blog post is "This crowd is great! #crowdtag politics obama healthcare," the micro-blog processing function 60 identifies the hashtag "#crowdtag" as an action word and tags the crowd of the user 20 with the keywords or interests "politics," "obama," and "healthcare." As another example, the micro-blog post may be "This crowd is great! #crowdtag #politics #obama #healthcare," and the micro-blog processing function 60 may then identify the hashtag "#crowdtag" as an action word and tag the crowd of the user 20 with the keywords or interests "politics," "obama," and "healthcare" as specified by the corresponding hashtags. As yet another example, the micro-blog post may be "Have a great time watching some #NCState #football! #crowdtag," and the micro-blog processing function 60 may then identify the hashtag "#crowdtag" as an action word and tag the crowd of the user 20 with the keywords or interests NCState and football. In this manner, the user 20 is enabled to explicitly define interests of the crowd. In a similar manner, the user 20 may untag a crowd (e.g., explicitly remove a keyword or interest from a profile of the crowd) using an "#untagcrowd" action word.

For the action word #ratecrowd, the corresponding action is to apply a rating specified by the user 20 in the micro-blog post. The rating may be, for example, a numerical rating (e.g., 3 out of a possible 5), a positive or negative rating (e.g., a "thumbs-up" or "thumbs-down"), or the like. More specifically, the rating to be applied to the crowd is explicitly defined by the user 20 and included in the micro-blog post and preferably immediately follows the action word "#ratecrowd" in the micro-blog post. For example, the micro-blog post may be "This crowd is great! #ratecrowd 5" or "This crowd is great! #ratecrowd like." For the former, the micro-blog processing function 60 applies a rating of 5 to the crowd. For the latter, the micro-blog processing function 60 applies a "like" rating (e.g., a thumbs-up rating) to the crowd. Similarly, the rating may be expressed as additional hashtags that immediately follow the #ratecrowd action word (e.g., "This crowd is great! #ratecrowd #like").

Lastly, for the action word #createcrowd, the corresponding action is to encourage the formation of a crowd of users at a desired location having one or more desired interests. The desired location may be the location of the user 20 at the time of sending the micro-blog post, a location specified in the micro-blog post, or a POI near the location of the user 20 that matches the desired interests of the new crowd (e.g., interest is sports and a sports bar is selected as the desired location for the new crowd). The one or more desired interests are explicitly specified in the micro-blog post and preferably immediately follow the action word #createcrowd in the micro-blog post. For example, the micro-blog post may be "Wanting to watch the NC State football game with fellow die-hard fans #createcrowd NCSU football." In response, the micro-blog processing function 60 identifies the hashtag #createcrowd as an action word and then performs an action to encourage the formation of a crowd having the interests of NCSU and football at the location from which the user 20 sent the micro-blog post. In general, the micro-blog processing function 60 may encourage the formation of the desired crowd by selecting users 20 that have user profiles that match the desired interests for the new crowd and then encouraging the selected users 20 move to the desired location. While not essential, for additional details regarding the creation of a new crowd, the interested reader is directed to U.S. patent application Ser. No. 12/859,837, entitled CROWD CREATION SYSTEM FOR AN AGGREGATE PROFILING SERVICE, which was filed Aug. 20, 2010, and is hereby incorporated herein by reference in its entirety for its teaching on crowd creation.

Once the corresponding action has been performed or at least initiated, the micro-blog processing function 60 determines whether the last hashtag has been processed (step 1710). Notably, in some embodiments, hashtags that immediately follow a hashtag identified as an action word may be processed as part of performing the corresponding action (e.g., performing the action for #crowdtag consumes immediately following hashtags that define hashtag(s) to be applied to the crowd in some embodiments). Such hashtags are considered to have been processed when making the determination in step 1710. If the last hashtag has not been processed, the micro-blog processing function 60 gets the next hashtag in the micro-blog post (step 1712), and the process returns to step 1706. Once the last hashtag has been processed, the process returns to step 1700 and is repeated for subsequently received micro-blog posts.

FIG. 15 is a block diagram of the MAP server 12 according to one embodiment of the present disclosure. As illustrated, the MAP server 12 includes a controller 120 connected to memory 122, one or more secondary storage devices 124, and a communication interface 126 by a bus 128 or similar mechanism. The controller 120 is a microprocessor, digital Application Specific Integrated Circuit (ASIC), Field Programmable Gate Array (FPGA), or similar hardware component. In this embodiment, the controller 120 is a microprocessor, and the application layer 40, the business logic layer 42, and the object mapping layer 62 (FIG. 2) are implemented in software and stored in the memory 122 for execution by the controller 120. Further, the datastore 64 (FIG. 2) may be implemented in the one or more secondary storage devices 124. The secondary storage devices 124 are digital data storage devices such as, for example, one or more hard disk drives. The communication interface 126 is a wired or wireless communication interface that communicatively couples the MAP server 12 to the network 28 (FIG. 1). For example, the communication interface 126 may be an Ethernet interface, local wireless interface such as a wireless interface operating according to one of the suite of IEEE 802.11 standards, or the like.

FIG. 16 is a block diagram of one of the mobile devices 18 according to one embodiment of the present disclosure. This discussion is equally applicable to the other mobile devices 18. As illustrated, the mobile device 18 includes a controller 130 connected to memory 132, a communication interface 134, one or more user interface components 136, and the location function 36 by a bus 138 or similar mechanism. The controller 130 is a microprocessor, digital ASIC, FPGA, or similar hardware component. In this embodiment, the controller 130 is a microprocessor, and the MAP client 30, the MAP application 32, and the third-party applications 34 are implemented in software and stored in the memory 132 for execution by the controller 130. In this embodiment, the location function 36 is a hardware component such as, for example, a GPS receiver. The communication interface 134 is a wireless communication interface that communicatively couples the mobile device 18 to the network 28 (FIG. 1). For example, the communication interface 134 may be a local wireless interface such as a wireless interface operating according to one of the suite of IEEE 802.11 standards, a mobile communications interface such as a cellular telecommunications interface (e.g., a 3G interface such as a Global System for Mobile Communications (GSM) interface, a 4G interface such as a Long Term Evolution (LTE) interface, or the like), or the like. The one or more user interface components 136 include, for example, a touchscreen, a display, one or more user input components (e.g., a keypad), a speaker, or the like, or any combination thereof.

The systems and methods described herein have substantial opportunity for variation without departing from the spirit and scope of the present disclosure. For example, FIGS. 10 through 14 describe several exemplary embodiments for obtaining hashtags in micro-blog posts made by the users 20 and utilizing those hashtags to provide crowd-based features. However, one of ordinary skill in the art will appreciate that the crowd-based features described above with respect to FIGS. 10 through 14 are exemplary. Other crowd-based features may be provided based on the hashtags obtained from the micro-blog posts of the users 20. For example, the interests of the users 20 in a crowd may be inferred from the hashtags in the micro-blog posts of the users 20 in the crowd and used to determine a degree to which the topics of the micro-blog posts of the users 20 in the crowd match.

As another example, while the discussion above focuses on micro-blog posts from the users 20 that are registered with the MAP server 12, the present disclosure is not limited thereto.

For example, the predefined action words described above with respect to FIG. 14 may be known and used by users that are not registered with the MAP server 12. For example, the micro-blog processing function 60 may query the micro-blogging service 26 for micro-blog posts including the one or more predefined action words and then process the micro-blog posts returned in response to the query regardless of whether the micro-blog posts come from the users 20 or non-registered users. With respect to non-registered users, the MAP server 12 may invite the non-registered users to register with the MAP server 12 in response to detecting that the non-registered users have used one or more of the predefined action words in their micro-blog posts.

The following use case illustrates some, but not necessarily all, of the aspects discussed above with respect to using hashtags in micro-blog posts to provide crowd-based features. Note that this use case is exemplary and is not intended to limit the scope of the concepts described herein.

Use Case:
1. John is an avid socialite and new media fanatic. He is a regular user of the Twitter® micro-blogging and social networking service as well as a registered user of the MAP server 12.
2. John has just finished dinner at a hip new restaurant downtown. It is a sushi/Jazz bar combo, and the ambiance is so nice that John decides to stay for a while and enjoy a cold drink.
3. To John's delight, he sees that there is a band setting up to play some live music. Unfortunately, the place is pretty dead (it is a Thursday night after all).
4. John knows that many of his friends would love to hear some live Jazz music and feels it is a shame that the band will be playing to an empty house, so John grabs his mobile device 18.
5. John decides that he is going to try to create a crowd at his current location. So, John opens his favorite Twitter® client and drafts the following tweet:
   Food and atmosphere at the new Sushi Blues is terrific. Here enjoying drinks and live jazz now. You guys should come out, it's going to be a great night!
6. Now, this tweet will get the message out to all of his Twitter® followers, but John also wants to utilize the crowd creation utilities of the MAP server 12 in order to attract as many people as possible.
7. Before sending his tweet, John remembers that the crowd services provided by the MAP server 12 give the ability to interact with its systems through the Twitter® micro-blogging and social networking service. So, he makes a few quick changes to his tweet such that it now reads:
   #Food and #atmosphere at the new #SushiBlues is terrific. Here enjoying #drinks and #livejazz now. You guys should come out, it's going to be a great night! #createcrowd
8. John posts the tweet, attaching his current location with Twitter's location option. He knows now that all of his followers will see his tweet, and that the MAP server 12 will initiate creation of a crowd at his location having the interest of food, atmosphere, SushiBlues, drinks, and live jazz.
9. John sits back, sips his drink, and enjoys the music while he watches the venue start to fill up with people.

Those skilled in the art will recognize improvements and modifications to the preferred embodiments of the present disclosure. All such improvements and modifications are considered within the scope of the concepts disclosed herein and the claims that follow.

What is claimed is:

1. A computer-implemented method, executed by at least one processor, the method comprising:
   obtaining a micro-blog post of a user in a crowd of users, the crowd of users being a group of users within a predefined spatial proximity to one another;
   obtaining a hashtag from the micro-blog post; and
   providing a crowd-based feature based on the hashtag from the microblog post, wherein providing the crowd-based feature based on the hashtag from the micro-blog post comprises:
   determining that the hashtag is representative of an interest of the crowd of users; and
   recording the hashtag as an interest of the crowd of users in response to determining that the hashtag is representative of an interest of the crowd of users, and
   wherein an aggregate profile is created for the crowd of users based on interests defined in user profiles of the users in the crowd of users, and recording the hashtag as an interest of the crowd of users comprises recording the hashtag in a separate profile maintained for the crowd of users that reflects topics of interests currently being discussed by the crowd of users.

2. The method of claim 1 wherein determining that the hashtag is representative of an interest of the crowd of users comprises determining that usage of the hashtag by users in the crowd of users exceeds a predefined threshold amount of usage.

3. The method of claim 1 wherein providing the crowd-based feature based on the hashtag from the micro-blog post further comprises assigning a weight to the hashtag recorded as an interest of the crowd of users.

4. The method of claim 1 wherein providing the crowd-based feature based on the hashtag from the micro-blog post comprises:
   determining that the hashtag is indicative of a rating of the crowd of users by the user; and
   updating a crowd rating of the crowd of users based on the hashtag in response to determining that the hashtag is indicative of a crowd rating of the crowd of users by the user.

5. The method of claim 4 wherein:
   determining that the hashtag is indicative of the crowd rating of the crowd of users comprises determining that the hashtag indicates that the user likes the crowd of users; and
   updating the crowd rating of the crowd of users comprises updating the crowd rating of the crowd of users in response to determining that the hashtag indicates that the user likes the crowd of users.

6. The method of claim 4 wherein:
   determining that the hashtag is indicative of the crowd rating of the crowd of users comprises determining that the hashtag indicates that the user likes the crowd of users and a degree to which the user likes the crowd of users; and
   updating the crowd rating of the crowd of users comprises updating the crowd rating of the crowd of users in response to determining that the hashtag indicates that the user likes the crowd of users and the degree to which the user likes the crowd of users.

7. The method of claim 4 wherein:
   determining that the hashtag is indicative of the crowd rating of the crowd of users comprises determining that the hashtag indicates that the user dislikes the crowd of users; and updating the crowd rating of the crowd of users comprises updating the crowd rating of the crowd of users in response to determining that the hashtag indicates that the user dislikes the crowd of users.

8. The method of claim 4 wherein:
determining that the hashtag is indicative of the crowd rating of the crowd of users comprises determining that the hashtag indicates that the user dislikes the crowd of users and a degree to which the user dislikes the crowd of users; and
updating the crowd rating of the crowd of users comprises updating the crowd rating of the crowd of users in response to determining that the hashtag indicates that the user dislikes the crowd of users and the degree to which the user dislikes the crowd of users.

9. The method of claim 1 wherein providing the crowd-based feature based on the hashtag from the micro-blog post comprises:
determining that the hashtag is one of one or more predefined action words, wherein each predefined action word of the one or more predefined action words has a corresponding crowd-based action; and
performing the corresponding crowd-based action for the one of the one or more predefined action words in response to determining that the hashtag is the one of the one or more predefined action words.

10. The method of claim 9 wherein the one of the one or more predefined action words is a reserved hashtag that explicitly requests that the crowd of users be tagged with one or more keywords defined in the micro-blog post, and performing the corresponding crowd-based action comprises tagging the crowd of users with the one or more keywords defined in the micro-blog post.

11. The method of claim 10 wherein performing the corresponding crowd based action further comprises identifying one or more keywords that immediately follow the one of the one or more predefined action words in the micro-blog post as the one or more keywords defined in the micro-blog post.

12. The method of claim 10 wherein performing the corresponding crowd based action further comprises identifying one or more additional hashtags in the micro-blog post as the one or more keywords defined in the microb-log post.

13. The method of claim 10 wherein tagging the crowd of users with the one or more keywords defined in the micro-blog post comprises recording the one or more keywords defined in the micro-blog post in a profile of the crowd of users.

14. The method of claim 9 wherein the one of the one or more predefined action words is a reserved hashtag that explicitly requests that one or more keywords defined in the micro-blog post are to be removed as tags of the crowd of users, and performing the corresponding crowd-based action comprises removing the one or more keywords defined in the micro-blog post as tags of the crowd of users.

15. The method of claim 14 wherein performing the corresponding crowd based action further comprises identifying one or more keywords that immediately follow the one of the one or more predefined action words in the micro-blog post as the one or more keywords defined in the micro-blog post.

16. The method of claim 14 wherein removing the one or more keywords defined in the micro-blog post as tags of the crowd of users comprises removing the one or more keywords defined in the micro-blog post from a profile of the crowd of users.

17. The method of claim 9 wherein the one of the one or more predefined action words is a reserved hashtag that explicitly requests that the crowd of users be assigned a rating explicitly defined in the micro-blog post, and performing the corresponding crowd-based action comprises updating a crowd rating of the crowd based on the rating explicitly defined in the micro-blog post.

18. The method of claim 17 wherein performing the corresponding crowd based action further comprises identifying text that immediately follows the one of the one or more predefined action words in the micro-blog post as the rating explicitly defined in the micro-blog post.

19. The method of claim 9 wherein the one of the one or more predefined action words is a reserved hashtag that explicitly requests that a new crowd of users having one or more interests defined in the micro-blog post be created, and performing the corresponding crowd-based action comprises creating the new crowd of users having the one or more interests defined in the micro-blog post.

20. The method of claim 19 wherein performing the corresponding crowd-based action further comprises identifying one or more keywords that immediately follow the one of the one or more predefined action words in the micro-blog post as the one or more interests defined in the micro-blog post.

21. The method of claim 19 wherein performing the corresponding crowd-based action further comprises identifying one or more additional hashtags in the micro-blog post as the one or more interests defined in the micro-blog post.

22. A method, executed by at least one processor, the method comprising:
obtaining a micro-bloq post of a user in a crowd of users, the crowd of users being a group of users within a predefined spatial proximity to one another;
obtaining a hashtaq from the micro-bloq post; and
providing a crowd-based feature based on the hashtaq from the microbloq post, wherein providing the crowd-based feature based on the hashtaq from the micro-bloq post comprises:
determining that the hashtaq is representative of an interest of the crowd of users; and recording the hashtaq as an interest of the crowd of users in response to determining that the hashtaq is representative of an interest of the crowd of users, and
wherein determining that the hashtaq is representative of an interest of the crowd of users comprises determining that usage of the hashtaq by users in the crowd of users exceeds a predefined threshold amount of usage and wherein determining that usage of the hashtag by the users in the crowd of users exceeds the predefined threshold amount of usage comprises determining that the hashtag has been used at least a predefined threshold number of times over a predefined amount of time.

23. The method of claim 22 wherein an aggregate profile is created for the crowd of users based on interests defined in user profiles of the users in the crowd of users, and recording the hashtag as an interest of the crowd of users comprises recording the hashtag such that the hashtag is included in the aggregate profile of the crowd of users.

24. A server computer executed by at least one processor, the server comprising:
a communication interface adapted to communicatively couple the server computer to a network; and
a controller associated with the communication interface and adapted to: obtain a micro-blog post of a user in a crowd of users, the crowd of users being a group of users within a predefined spatial proximity to one another;
obtain a hashtag from the micro-blog post; and
provide a crowd-based feature based on the hashtag from the micro-blog post, wherein in providing the crowd-based feature based on the hashtaq from the micro-bloa post the controller is further adapted to:

determine that the hashtaq is representative of an interest of the crowd of users; and record the hashtaq as an interest of the crowd of users in response to determining that the hashtaq is representative of an interest of the crowd of users, and wherein an aggregate profile is created for the crowd of users based on interests defined in user profiles of the users in the crowd of users, and recording the hashtaq as an interest of the crowd of users comprises recording the hashtaq in a separate profile maintained for the crowd of users that reflects topics of interests currently being discussed by the crowd of users.

25. A non-transitory computer-readable storage medium storing software for instructing a controller of a computing device to:

obtain a micro-blog post of a user in a crowd of users, the crowd of users being a group of users within a predefined spatial proximity to one another;

obtain a hashtag from the micro-blog post; and provide a crowd-based feature based on the hashtag from the micro-blog post, wherein providing the crowd-based feature based on the hashtag from the micro-blog post comprises:

determining that the hashtag is representative of an interest of the crowd of users; and recording the hashtag as an interest of the crowd of users in response to determining that the hashtag is representative of an interest of the crowd of users, and wherein an aggregate profile is created for the crowd of users based on interests defined in user profiles of the users in the crowd of users, and recording the hashtag as an interest of the crowd of users comprises recording the hashtag in a separate profile maintained for the crowd of users that reflects topics of interests currently being discussed by the crowd of users.

26. A server computer executed by at least one processor, the server comprising:

a communication interface adapted to communicatively couple the server computer to a network; and a controller associated with the communication interface and adapted to:

obtain a micro-blog post of a user in a crowd of users, the crowd of users being a group of users within a predefined spatial proximity to one another;

obtain a hashtag from the micro-blog post; and provide a crowd-based feature based on the hashtag from the micro-blog post, wherein in providing the crowd-based feature based on the hashtag from the micro-blog post, the controller is further adapted to:

determine that the hashtag is representative of an interest of the crowd of users; and record the hashtag as an interest of the crowd of users in response to determining that the hashtag is representative of an interest of the crowd of users, and wherein determining that the hashtag is representative of an interest of the crowd of users comprises determining that usage of the hashtag by users in the crowd of users exceeds a predefined threshold amount of usage and wherein determining that usage of the hashtag by the users in the crowd of users exceeds the predefined threshold amount of usage comprises determining that the hashtag has been used at least a predefined threshold number of times over a predefined amount of time.

27. A non-transitory computer-readable storage medium storing software for instructing a controller of a computing device to:

obtain a micro-blog post of a user in a crowd of users, the crowd of users being a group of users within a predefined spatial proximity to one another;

obtain a hashtag from the micro-blog post; and provide a crowd-based feature based on the hashtag from the micro-blog post, wherein providing the crowd-based feature based on the hashtag from the micro-blog post comprises:

determining that the hashtag is representative of an interest of the crowd of users; and recording the hashtag as an interest of the crowd of users in response to determining that the hashtag is representative of an interest of the crowd of users, and wherein determining that the hashtag is representative of an interest of the crowd of users comprises determining that usage of the hashtag by users in the crowd of users exceeds a predefined threshold amount of usage and wherein determining that usage of the hashtag by the users in the crowd of users exceeds the predefined threshold amount of usage comprises determining that the hashtag has been used at least a predefined threshold number of times over a predefined amount of time.

* * * * *